United States Patent [19]

Suzuki et al.

[11] Patent Number: 5,660,929

[45] Date of Patent: Aug. 26, 1997

[54] PERPENDICULAR MAGNETIC RECORDING MEDIUM AND METHOD OF PRODUCING SAME

[75] Inventors: Takao Suzuki, Sendai; Masato Sagawa, Nagaokakyo, both of Japan

[73] Assignee: Sumitomo Special Metals Co., Ltd., Osaka, Japan

[21] Appl. No.: 154,393

[22] Filed: Nov. 18, 1993

Related U.S. Application Data

[63] Continuation of Ser. No. 879,448, May 1, 1992, abandoned, which is a continuation of Ser. No. 693,089, Apr. 30, 1991, abandoned, which is a continuation of Ser. No. 273,877, Oct. 14, 1988, abandoned, which is a continuation of Ser. No. 797,112, Nov. 12, 1985, abandoned.

[30] Foreign Application Priority Data

Nov. 12, 1984 [JP] Japan ................... 59-236661

[51] Int. Cl.$^6$ .......................... G11B 5/66; B32B 33/00
[52] U.S. Cl. .............. 428/332; 428/336; 428/694 MT; 428/694 RE; 428/694 XS; 428/694 T; 428/900; 428/928; 427/128; 427/129; 427/130; 427/131; 427/132; 365/122; 360/131; 360/135; 369/288
[58] Field of Search ................. 478/900, 928, 478/694 T, 694 MT, 694 RE, 694 XS, 332, 336; 427/128, 129, 131, 130, 132; 365/122; 360/131, 135; 369/288

[56] References Cited

U.S. PATENT DOCUMENTS

| 4,367,257 | 1/1983 | Arai et al. | 428/220 |
| 4,544,443 | 10/1985 | Ohta et al. | 216/24 |
| 4,666,759 | 5/1987 | Ohkawa et al. | 428/213 |

FOREIGN PATENT DOCUMENTS

| 56-170837 | 5/1983 | Japan. |
| 58-165306 | 9/1983 | Japan. |
| 59-84358 | 6/1984 | Japan. |
| 59-108304 | 6/1984 | Japan. |
| 59-103314 | 6/1984 | Japan. |
| 60-117436 | 6/1985 | Japan. |
| 60-128606 | 7/1985 | Japan. |
| 60-173810 | 9/1985 | Japan. |
| 60-187008 | 9/1985 | Japan. |
| 60-193125 | 10/1985 | Japan. |

OTHER PUBLICATIONS

Journal de Physique, Sep. 1985, Carey et al., "Sputtered NdFe Films With Perpendicular Anisotropy", pp. C6–111 –C–115.
Journal of Materials Science Letters vol. 4, 1985, Carey et al., "Fine-particle NdFe Films with High Coercivity and Perpendicular Anisotropy," pp. 1302–1304.
R.J. Gambino et al., J. Appl. Phys. 57(1), 15 Apr. 1985 Magneto–optic properties of Nd–Fe–Co. amorphous alloys.
Katayama et al., "Annealing Effects on Magnetic Properties of Amorphous GdCo, GdFe, and Gd Co Mo Films", J. appl. Phys 49(3) Mar. 1978 p. 1759.
Taylor et al., J appl. Phys. 45(5) May 1978 p. 2885.
Gambino et al. "Magneto–Optic Properties of Nd–Fe–Co Amorphous Alloys" J. appl. Phys 57(1) 15 Apr. 1985, pp. 3906–3908.

*Primary Examiner*—Leszek Kiliman
*Attorney, Agent, or Firm*—Burns, Doane, Swecker & Mathis, LLP

[57] ABSTRACT

A perpendicular magnetic recording medium is fabricated based on $R_{21-60}(Fe_{1-y}Co_y)_zM_{0-10}$ wherein z is balance and at least 70 at % of R is Nd and/or Pr, the balance of R being one or more of other rare earth elements, and wherein y is less than 0.5 by atomic ratio. M is at least one of various additional metal elements. The Curie temperature Tc is between 70° to 250° C.; the saturation magnetization Ms is about 450 emu/cc or more; the uniaxial perpendicular magnetic anisotropy constant Ku of $2.5\times10^6$ erg/cc or more is attained. Kerr rotation angle is 0.3 degree or more, which provides a magneto-optic recording medium. Since light rare earth elements having the collinear alignment of magnetic moment with Fe are used as a key element, it is possible to fabricate uniform perpendicular magnetic anisotropy thin films in a mass production scale at a low cost.

62 Claims, 21 Drawing Sheets

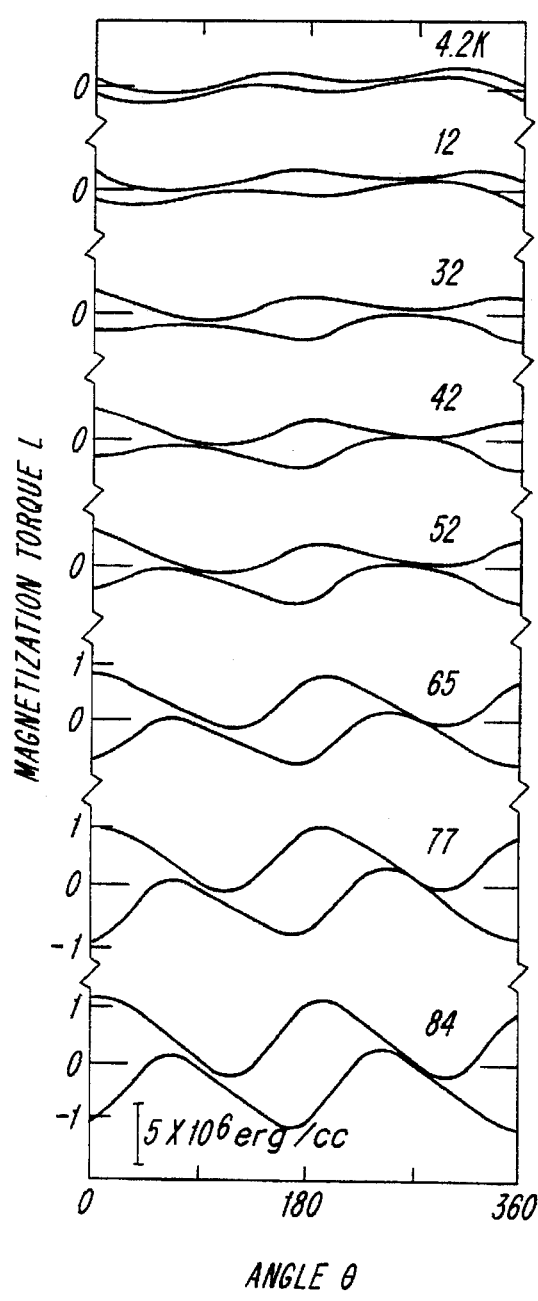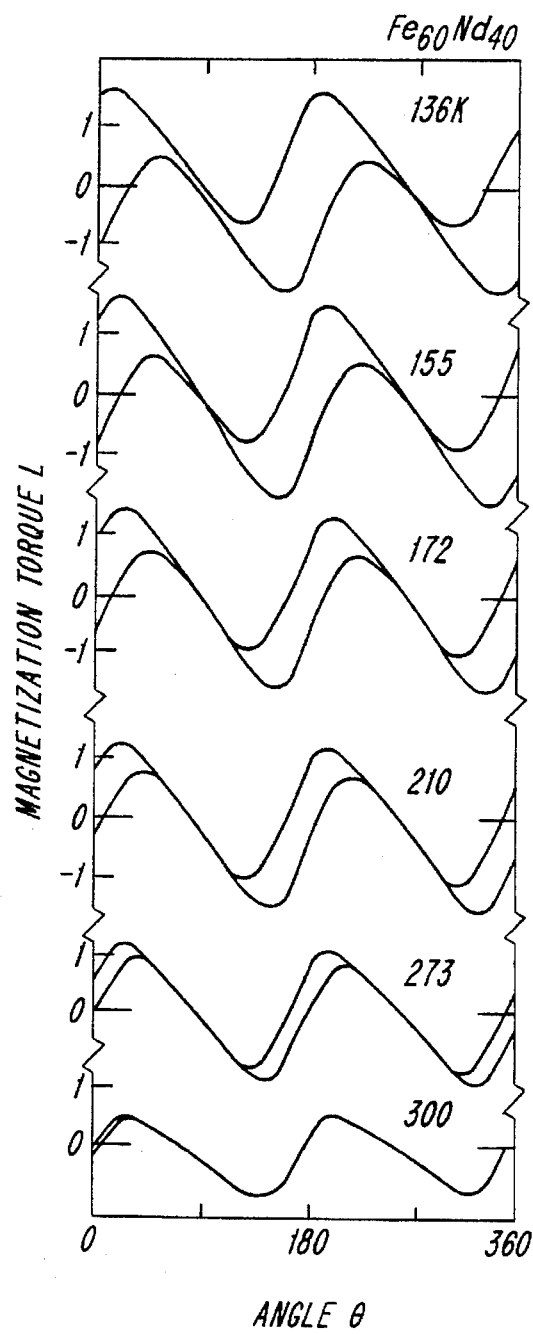
FIG. 9A
FIG. 9B

PERPENDICULAR MAGNETIC RECORDING MEDIUM AND METHOD OF PRODUCING SAME

This application is a continuation of application Ser. No. 07/879,448, filed May 1, 1992 now abandoned, which is a continuation of application Ser. No. 07/693,089, filed on Apr. 30, 1991; which is a continuation of application Ser. No. 07/273,877, filed on Oct. 14, 1988; which is a continuation of application Ser. No. 06/797,112, filed Nov. 12, 1985, all of which are now abandoned.

FIELD OF THE INVENTION

The present invention relates generally to a perpendicular magnetic recording medium and, particularly, a magneto-optic recording medium, and a method of producing the same, and more specifically to rare earth-transition metal amorphous alloy thin films provided with perpendicular magnetic anisotropy, which are useful in magnetically (or further magneto-optically) recording data in a high memory density. The term "rare earth" herein denotes "rare earth element", and the term "recording medium" herein is used in a broadest sense.

BACKGROUND OF THE DISCLOSURE

There exists a strong demand for higher-speed and higher-density non-volatile recording media, as compared with the conventional memory devices such as ferrite cores, magnetic tapes or discs, etc., with increasing scale and decreasing size in computer systems. To satisfy the above-mentioned demand, magneto-optical thin film recording media have recently been highlighted owing to the availability for storage devices of great capacity and high density. In general, a laser beam is used as the light source, the laser beam being allowed to be incident upon the thin film surface in the direction perpendicular thereto. A great number of microscopic magnetic domains are magnetized minutely and separately below the Curie temperature when no laser beam is incident thereupon, but demagnetized above the Curie temperature when the laser beam is incident thereupon, because of a rise in temperature on the thin film.

As ferromagnetic thin films provided with an easy axis for magnetization in the direction perpendicular to the thin film plane, conventionally, there have been known polycrystalline metal thin films such as MnBi, MnCuBi, CoCr, etc., monocrystalline compound thin films represented by GIG (Gd—Fe garnet) and rare earth-transition metal amorphous thin films such as Gd—Co, Gd—Fe, Tb—Fe, Dy—Fe, etc.

The present invention relates, in particular, to rare earth-transition metal amorphous metal thin films. The amorphous metal thin films are suitable for a magneto-optic recording material, because in contrast to polycrystalline thin film there exist no crystal grain boundaries which will cause noise, and additionally there exists an advantage such that a wide thin film can readily be produced.

In order to use the rare earth-transition metal amorphous metal alloy film as a magneto-optic recording medium of a high memory density, it is required that the easy axis for magnetization thereof is perpendicular to the film plane. This necessary condition, the perpendicular magnetic anisotropy is not always induced at any cases in the above amorphous metal alloys, but the easy axis for magnetization shows rather a tendency to be arranged in the direction parallel to the film plane depending upon an effect produced by an occurrence of a demagnetizing field. Therefore, in order to obtain a perpendicular magnetic film, it is necessary to provide a uniaxial anisotropic magnetic energy enough to overcome the above demagnetizing field.

The magnitude of perpendicular magnetic anisotropy in a thin film can be represented on the basis of a value of uniaxial perpendicular magnetic anisotropy constant Ku. It has been generally considered that, in order to realize a perpendicular magnetic anisotropic film, the relationship of $Ku > 2\pi Ms^2$ should be satisfied, where Ms denotes the saturation magnetization, and Ku is defined as $Ku = Ku\perp + 2\pi Ms^2$.

In this specification, the term "perpendicular magnetic anisotropy" embraces at least those mediums that satisfy above conditions.

In the perpendicular magnetic recording medium, since a high recording density is generally required, it is very important that the saturation magnetization Ms is great enough to stably maintain microscopic magnetic domains and additionally that the uniaxial perpendicular magnetic anisotropy constant Ku is sufficiently large. Further, since a laser beam is usually used as the writing power source, it is required that the Curie temperature Tc is sufficiently low, e.g., approximately ranging from 100° to 200° C.; the crystallization temperature Tcry is sufficiently higher than the Curie temperature Tc; and the difference in temperature between both is at least about 50° C., and preferably, about 100° C. or more.

The most well-known combination of rare earth elements and transition metals as the perpendicular magnetic anisotropic metal alloy thin film is that of heavy rare earth elements and iron. The typical examples are Tb—Fe, Gd—Fe, Dy—Fe, Gd—Tb—Fe, Tb—Dy—Fe, etc. In the case of Tb—Fe, for instance, the magnetic characteristics are such that the Curie temperature Tc is 140° to 250° C.; the Kerr rotation angle θk is approximately 0.3 degrees; the saturation magnetization Ms is 50 to 100 emu/cc, and the uniaxial perpendicular magnetic anisotropy constant Ku is 0.1 to $1 \times 10^6$ erg/cc.

In the above metal alloy thin film, however, since the heavy rare earth elements such as Tb, Dy, Gd, etc. to be included therein are relatively rare in availability exist in only a small percentage in the crust of the earth, and very complicated element separating processes are required, thus the material cost is very high.

Additionally, it is difficult to fabricate a great amount of uniform products on a large mass production scale, because the atomic magnetic moments of heavy rare earth elements and iron are to be combined with each other in an antiparallel fashion, and therefore the saturation magnetization Ms and the Curie temperature Tc depend greatly upon the compositional proportion of the elements.

In contrast thereto, light rare earth elements such as Nd, Pr, etc. more abundantly exist in the crust of the earth as compared with the heavy rare earth elements. Therefore, if the rare earth-iron alloy thin film having perpendicular magnetic anisotropy can be fabricated by employing light rare earth elements, it is possible to completely overcome the above serious problems with respect to resources.

So far, light rare earth-iron amorphous metal alloy have been studied as follows: J. J. Croat has reported ribbon alloys composed of around $Fe_{0.60}Nd_{0.40}$ or $Fe_{0.60}Pr_{0.40}$ formed by melt-quenching and has discussed a possibility for permanent magnets, because a high coercive force had been obtained, Appl. Phys. Lett. 39 (4), 15th Aug., 1981. These ribbon alloys formed by the melt-quenching technique, however, are not uniform throughout the alloy and, further, are not anisotropic, but are rather essentially isotropic. Furthermore, the thickness of the ribbon was 33 to 208 μm, which was far less from that required for a recording medium.

Recently, K. Tsutumi et al have reported that a thin film composed of $Fe_{61.5}Nd_{34}Ti_{4.5}$ and formed by sputtering has perpendicular magnetic anisotropy, Japan J. Appl. Phys. 23 (1984), Page L 169 to L 171. However, the characteristics are such that: Ms is 430 emu/cc and Ku is $2\times10^6$ erg/cc. Further, with respect to Fe—Nd sputtered thin films including no Ti, only thin films of in-plane anisotropy have been reported although the forming conditions are not clear.

In summary, in the case of amorphous anisotropic thin films composed of light rare earth elements and iron, so far it has been considered that it is impossible to provide perpendicular magnetic anisotropy energy strong enough to overcome the effect by the demagnetizing field thereof because of its high saturation magnetization.

SUMMARY OF THE DISCLOSURE

With these problems in mind, therefore, it is a primary object of the present invention to provide a novel perpendicular magnetic recording medium and, particularly, magneto-optic recording medium, and a method of producing the same based on light rare earth elements and iron.

It is a further object of the present invention to provide a perpendicular magnetic recording medium (and, particularly, magneto-optic recording medium) having excellent stable perpendicular magnetic recording properties, preferably while reducing the material cost and eliminating complicated fabricating processes so as to well be applicable to a large scale mass production process.

Other objects will become apparent in the entire disclosure.

To achieve the above-mentioned object, the present invention provides a perpendicular magnetic recording medium (and particularly, magneto-optic recording medium) having a composition with the key elements being iron and rare earth elements(s), or additionally Co being added thereto, the rare earth element(s) being mainly of neodymium Nd and/or praseodymium Pr.

In the first aspect of the present invention, the perpendicular magnetic recording medium consists essentially of 21 to 60 (preferably 31 to 60) atomic percent rare earth elements R and the balance of iron Fe wherein 70–100 atomic percent of the R being neodymium Nd and/or praseodymium Pr the balance of the R being one or more selected from the group consisting of yttrium Y, lanthanum La, cerium Ce, samarium Sm, gadolinium Gd, terbium Tb, dysprosium Dy, holmium Ho, erbium Er and ytterbium Yb. In the following, the symbol "R" refers to the rare earth elements hereinabove specified, however, the rare earth elements R may not be pure elements and may contain other rare earth elements other than those specified above in small amounts.

In the second aspect of the present invention, the perpendicular magnetic recording medium having the composition of the first aspect wherein cobalt Co of less than 50 (preferably less that 30) atomic percent of the entire Fe is substituted for Fe.

In the third aspect of the present invention, the perpendicular magnetic recording medium additionally comprises not exceeding 10 atomic percent of at least one additional element M selected from the group consisting of nickel Ni, zirconium Zr, niobium Nb, vandadium V, tantalum Ta, chromium Cr, molybdenum Mo, tungsten W, manganese Mn, bismuth Bi, aluminium Al, silicon Si, lead Pb, gerumanium Ge, tin Sn, antimony Sb and hafnium Hf.

In the fourth aspect of the present invention, the composition can be expressed by a formula: R(Fe, Co)M, which includes 21 to 60 atomic percent rare earth elements R, 0 to 10 atomic percent additional element(s) M and the balance of Fe and Co, wherein Co amounts to less than 50 atomic percent of the sum of Fe and Co to be counted as the balance and wherein 70–100 atomic percent of the entire R consists of Nd and/or Pr(Nd, Pt), the balance of R being one or more of Y, La, Ce, Sm, Gd, Tb, Dy, Ho, Er and Yb; and wherein, here, Ti is counted as M in the case where Co is present.

In the following, "%" or "at %" denotes atomic percent, if not otherwise specified.

Further, to achieve the above-mentioned object, the method of fabricating the perpendicular magnetic recording medium according to the present invention comprises, in a process for producing a thin film on a substrate by a metal gas deposition technique, the steps of:

maintaining a substrate at a temperature between 180° C. and a temperature lower than the crystallization temperatures Tcry of said compositions, and forming a perpendicular magnetic anisotropic thin film of a defined composition on the substrate by the metal gas deposition technique; preferably up to a film thickness from about 0.3 to about 3 μm. Here, the composition includes those mentioned in the preceding aspects.

In a still further aspect of the present invention, the Kerr rotation angle θk is significantly increased by oxidization in the film surface or by SiO coating on the film surface, while a combination thereof is useful, too.

In the perpendicular magnetic or magneto-optic recording medium according to the present invention, it is possible to obtain an amorphous metal alloy thin film of perpendicular magnetic anisotropy provided with characteristics such that the Curie temperature Tc is from 70° to 250° C.; the saturation magnetization Ms is about 450 emu/cc or more; the uniaxial perpendicular magnetic anisotropy constant Ku is at least $1\times10^6$ erg/cc and up to 2.5 to $7\times10^6$ erg/cc or more, the Kerr rotation angle θk is about 0.3–0.55 degree or more; that is, which are each equivalent or superior to those of heavy rare earth-iron amorphous thin films, in spite of the fact that iron and light rare earth elements such as Nd and/or Pr are used which are relatively abundant in resources and less expensive. The perpendicular magnetic anisotropy constant Ku of at least $1\times10^6$ erg/cc provides a perpendicular magnetic recording medium which can be written or read at least through a magnetic head. With the high Kerr rotation angle the perpendicular magnetic thin film can be written or read magneto-optically.

As is discussed previously, it has been generally considered that the condition $Ku>2\pi Ms^2$ should be satisfied for the perpendicular magnetic film. In the present invention, however, the magnetic domain is very finely divided, wherein the demagnetizing field is less than the apparent demagnetizing field resulting in a perpendicular magnetic film even without satisfying said condition. It appears that $Ku>0.6\times2\pi Ms^2$ is roughly sufficient. As to whether or not a perpendicular magnetic film occurs, it can be determined by measuring the magnetization curves in both directions perpendicular (⊥) and parallel (//) to the film plane as shown in FIG. 3.

Further, the Curie temperature Tc and the Kerr rotation angle θk can be increased up to 0.5 degree or more by substituting Co for a part of Fe.

Still further in the present invention, wherein the magnetic moments of each atom are combined in collinearly parallel to each other on the basis of combination of Nd, Pr and iron, it is possible to obtain a saturation magnetization Ms higher than that in heavy rare earth-iron films, so that the precision of recording/reading data can be further improved. By the same token, as shown in FIG. 2, the saturation magnetization Ms or Curie temperature Tc are less dependent upon the compositional proportion so that a more uniform thin film can be easily obtained.

Furthermore, in the magnetic or thermomagnetic writing, it is possible to reduce the magnitude of magnetic field to be applied to the film from the outside, because the leak magnetic flux can be utilized due to the higher saturation magnetization.

A yet further significant improvement in the increase in the Kerr rotation angle θk can be obtained by oxidizing the film surface or coating by SiO, or a combination thereof based on the thin film hereinabove mentioned. The large Kerr rotation angle provides a higher S/N ratio.

BRIEF DESCRIPTION OF THE DRAWINGS

The features and advantages of the perpendicularly magnetizable recording medium and the method of fabricating the same according to the present invention will be more clearly appreciated from the following description taken in conjunction with the accompanying drawings in which:

FIGS. 9A and 9B are graphs showing the relationship between magnetization torque L and angle θ at torque measurement under magnetic field of 15 kOe ($1.2\times10^6$ A/m) at various temperatures from 4.2 to 300 K. ($-269°$ to $27°$C.) in $Fe_{60}Nd_{40}$;

DETAILED DESCRIPTION OF THE PREFERRED EMBODIMENTS

Figure 1:
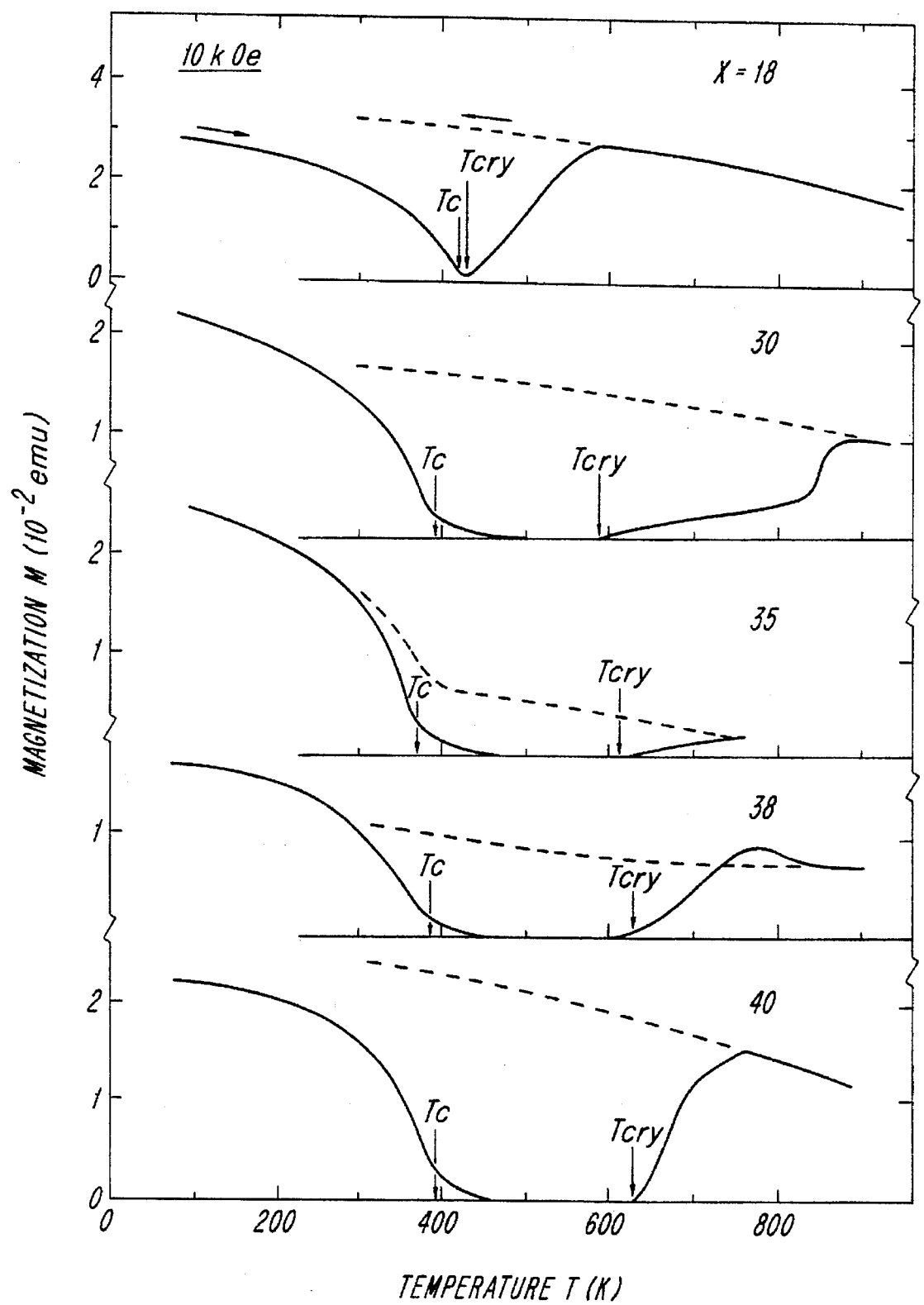
FIG. 1 is a graph showing the relationship between temperature T and magnetization M in an embodiment of $Fe_{100-x}Nd_x$ by applying a magnetic field of 10 kOe ($0.8\times10^6$ A/m) as a function of Nd content x.

The perpendicular magnetic, particularly, magneto-optic recording roedim and the method of producing the same will be described in further detail with reference to the attached drawings.

As already described hereinabove, the composition of the medium of the present invention can be generally expressed by a formula $R_{21-60}(Fe_{1-y}Co_y)_{bal}M_{0-10}$, wherein y is less than 0.5 by atomic ratio and 70–100 at % of R consists of Nd and/or Pr. That is to say, 21 to 60 atomic percent rare earth elements R are included in the whole composition; however, 70 atomic percent or more of the entire R is Nd and/or Pr. It is particularly preferred to use Nd. Further, it is also possible to use one or more of other rare earth elements such as Ce, Y, Sm, Dy, Tb, Ho, Gd, La, Er and Yb as the balance of R from the standpoint of easiness in procurement. It is preferred that the balance ($Fe_{1-y}Co_y$) is at least 40 atomic percent.

In the case where at least 21 at % R is contained, the temperature difference of more than $50°$ C. between Tcry and Tc and a Ku of at least $1\times10^6$ erg/cc are obtained, which is generally useful as a perpendicular magnetic recording medium which can be recorded through a magnetic head.

In the case where 31 atomic percent or more of the rare earth element R is included, it is possible to obtain a stable uniaxial (i.e., perpendicular) magnetic anisotropy constant Ku of at least $2.5\times10^6$ erg/cc in the direction perpendicular to the thin film plane, thus, this range is preferred.

Where the R content of the composition exceeds 60 atomic percent, the formed thin film is not stable in the anisotropy constant, because active rare earth elements are included excessively. Therefore, the content of R should be between 21 and 60 atomic percent (preferably 31% or more). More preferred is an R range from 33 to 50% providing Ku of $3\times10^6$ erg/cc or more with a desired stability of film, and most preferred is an R range from 35 to 45% in view of Ku. The dependence of the perpendicular magnetic anisotropy constant Ku upon the content x of rare earth element R is clearly shown in FIG. 8.

The balance of the R consists primarily of Fe. However, it is also possible that Co is substituted for less than 50 (preferably less than 30) atomic percent of the entire Fe to be counted as the balance where Co is not contained in order to increase the saturation magnetization Ms, the Curie temperature Tc and the Kerr rotation angle, and further to improve the corrosion resistance of the thin film, without deteriorating the characteristics required for generally perpendicular magnetic or particularly magneto-optic thin films. If Co is substituted for Fe in an amount less than 50% of Fe, the temperature difference between the crystallization temperature Tcry and the Curie temperature Tc becomes small and Kerr rotation angle θk becomes small, too. Besides, if so, targets for sputtering become brittle resulting in difficulty in production thereof. Thus Co substitution should be less than 50 at % of the entire Fe. So long as the Kerr rotation angle is concerned, a Co substitution amount for Fe from about 8 at % to less than 30 at % is preferred (θk of 0.45° or more ), and a Co substitution amount of about 12 to about 27 at % is most preferred (θk of 0.5° or more).

Further, it is also possible to add not exceeding 10 atomic percent of at least one of additional metal elements such as Ni, Zr, Nb, V, Ta, Cr, Mo, W, Mn, Bi, Al, Pb, Sb, Ge, Sn and Hf (referred to as "additional elements M" which further embraces Si) also without deteriorating the magnetic characteristics required for magneto-optic or particularly perpendicular magnetic thin films. It is preferred that the sum of M does not exceed 10 at %.

It is also possible to add 10 atomic percent or less of titanium Ti to above compositions. In this case, the Ku can be as high as $3 \times 10^6$ erg/cc, provided that the specific process of the present invention is applied.

Generally, a protective layer of $SiO_2$ or AlN is provided to improve the corrosion resistance of the thin film. In the present invention, the incorporation of Co and/or some of the additional elements M in the Fe(Nd, Pr) alloy system improves the corrosion resistance of the thin film per se, such M being one or more of Ni, Zr, Nb, V, Ta, Cr, Mo, W, Al, Hf, Ti, Ni and Si.

As already explained hereinabove, since a laser beam is used as the writing power source in magneto-optically writing data onto the thin film, the Curie temperature Tc should be low and the crystallization temperature Tcry should be high, and the difference between the two should be great.

FIG. 1 shows these temperature characteristics in $Fe_{100-x}Nd_x$ (x=18,30,35,38 and 40).

FIG. 1 indicates that the Curie temperature Tc is from 350 to 400 K. (77° to 127° C.), which is roughly equivalent to that (about 70° C.) of Dy—Fe or that (about 140° C.) of Tb—Fe. Further, the difference in temperature between Tc and Tcry is about 200° C. or more except the case of Nd content x=18, so that it is well understood that magneto-optic writing of data onto the thin film is possible by applying heat (, e.g., by a laser beam). The temperature difference of 200° C. or more provides a sufficient stability to the alloy state which is kept substantially in the amorphous state even when heating is repeated.

Figure 2:
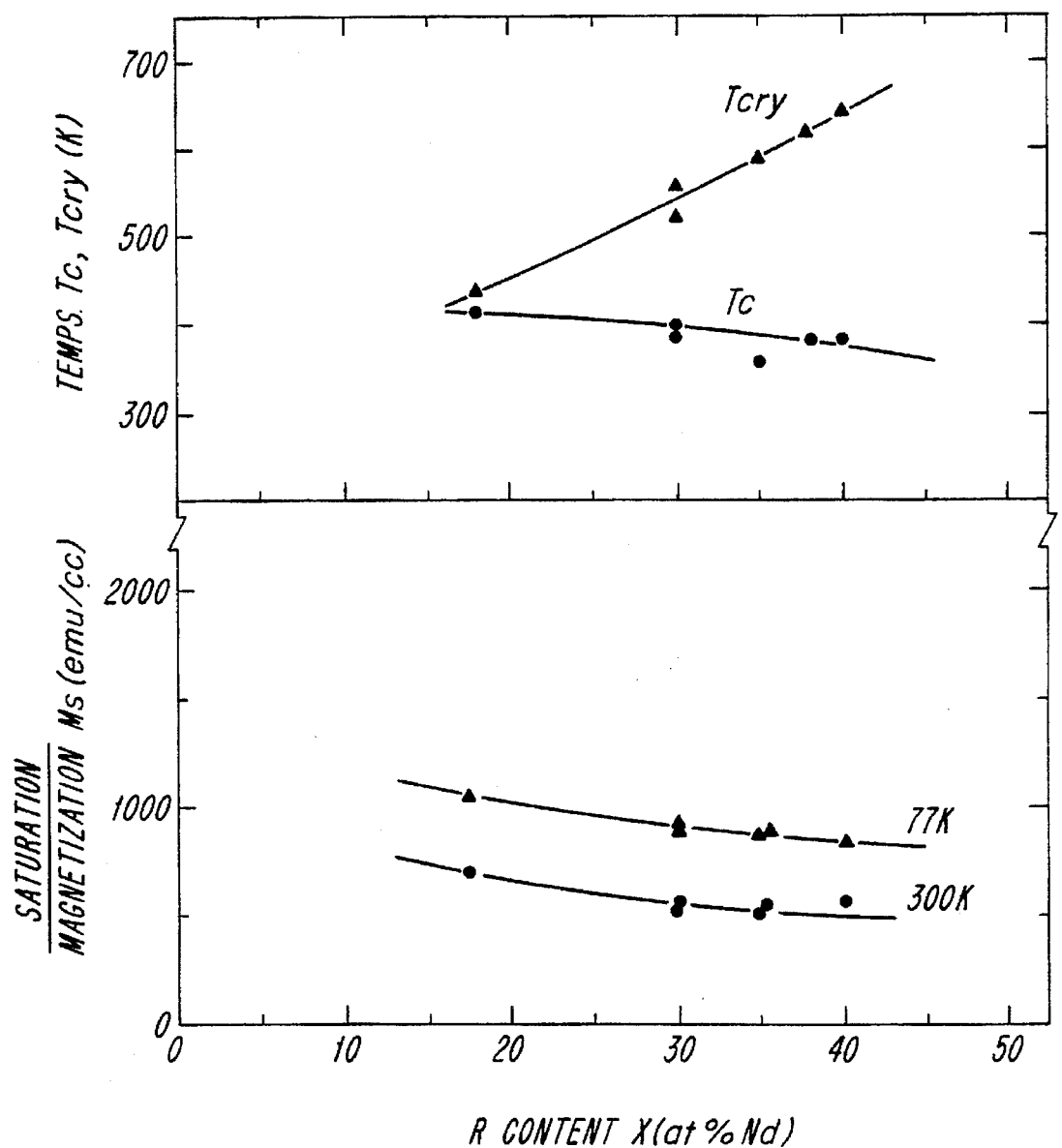
FIG. 2 is graphs showing the relationship between Nd content x and Curie temperature Tc, crystallization temperature Tcry and the relationship between Nd content x and saturation magnetization Ms at 77 K. ($-196°$ C.) and 300 K. ($27°$ C.) in $Fe_{100-x}Nd_x$.

FIG. 2 shows the dependence of the Curie temperature Tc, the crystallization temperature Tcry and the saturation magnetization Ms in $Fe_{100-x}Nd_x$ upon the R(Nd) content x. FIG. 2 indicates that the change rate in both Tc or Ms is small over a wide range and therefore it is possible to fabricate very stable products in quality with greater ease compared with heavy rare earth-iron perpendicular magnetic anisotropy thin films. At a Nd content of 21 at % or more, the temperature difference (Tcry-Tc) is at least 50° C.

Figure 3B:
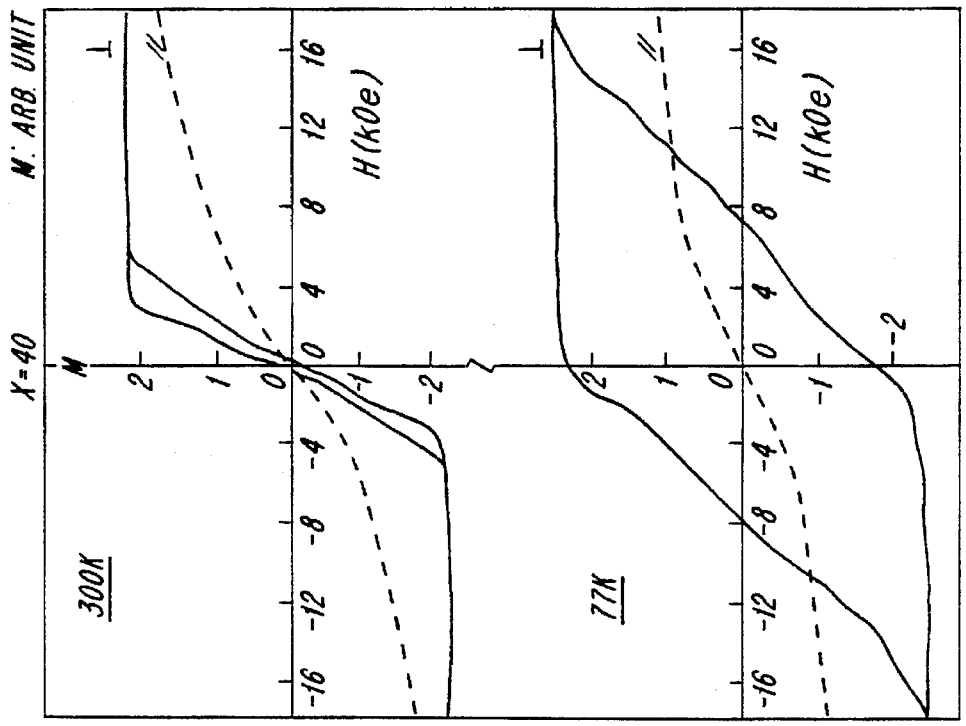
FIGS 3A and 3B are graphs showing various magnetization curves in $Fe_{100-x}Nd_x$ at 77 K. ($-196°$ C.) and 300 K. ($27°$ C.) for each Nd content x of 35 and 40.
Figure 3A:
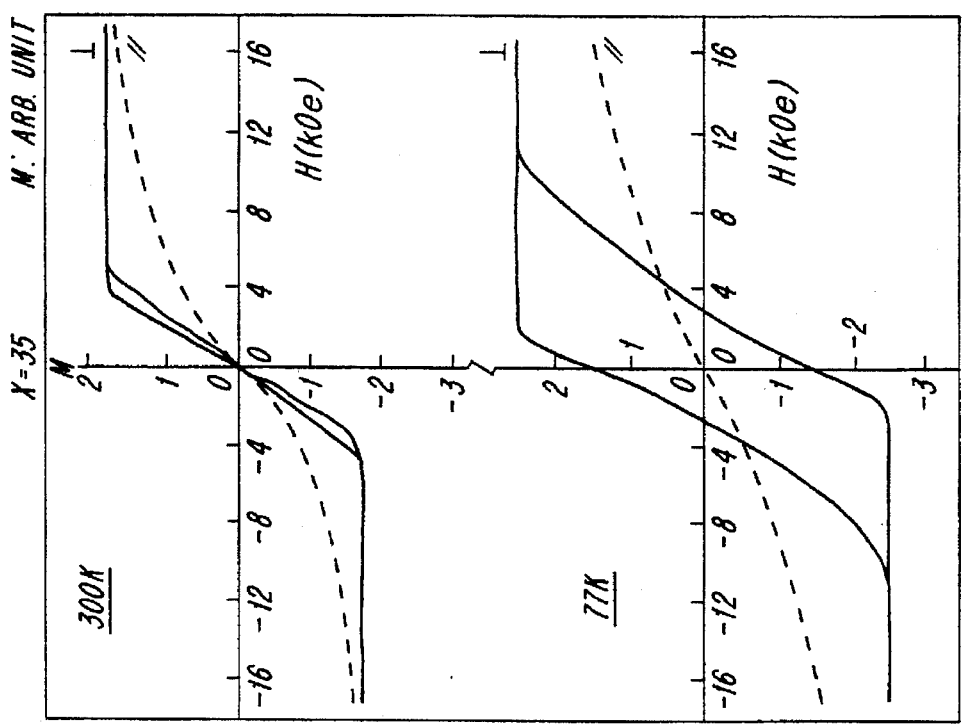

FIGS 3A and 3B show magnetization curves at 77 K. (−196° C.) and 300 K. (27° C.) in about 0.8 to 1.0 μm thick $Fe_{100-x}Nd_x$ (X=35, 40) films. The solid and broken lines correspond to curves obtained at a perpendicular direction (⊥) and parallel direction (//) of the film plane by applying an external magnetic field perpendicular and parallel to the film plane, respectively. These curves indicate that the samples are perpendicularly magnetizable at both the temperatures but the residual magnetism is very small at 27° C. but increases at a lower temperature −196° C. Further, the Kerr rotation angle θk of these films are 0.3 degree, which is roughly equal to or more than that of the heavy rare earth-iron amorphous perpendicular magnetic film.

In the thin film according to the present invention, since the saturation magnetization Ms is fairly high, it is necessary for the perpendicular magnetic recording medium that the perpendicular magnetic anisotropy constant Ku is greater than $1 \times 10^6$ erg/cc, and Ku of at least $2.5 \times 10^6$ erg/cc is preferred. As substrate materials for the amorphous thin film, glass, Al, polyimido resin, polyester resin, etc. are generally usable. However, in the embodiment according to the present invention, since the substrate should be maintained at a temperature between 180° C. and a temperature lower than the crystallization temperature in order to obtain a perpendicular magnetic anisotropy film, it is necessary to use a substrate material which can withstand the above temperature. The substrate temperature from 200° to 300° C. is a preferable range in which $Ku=3 \times 10^6$ erg/cc or more can be obtained.

Figure 4:
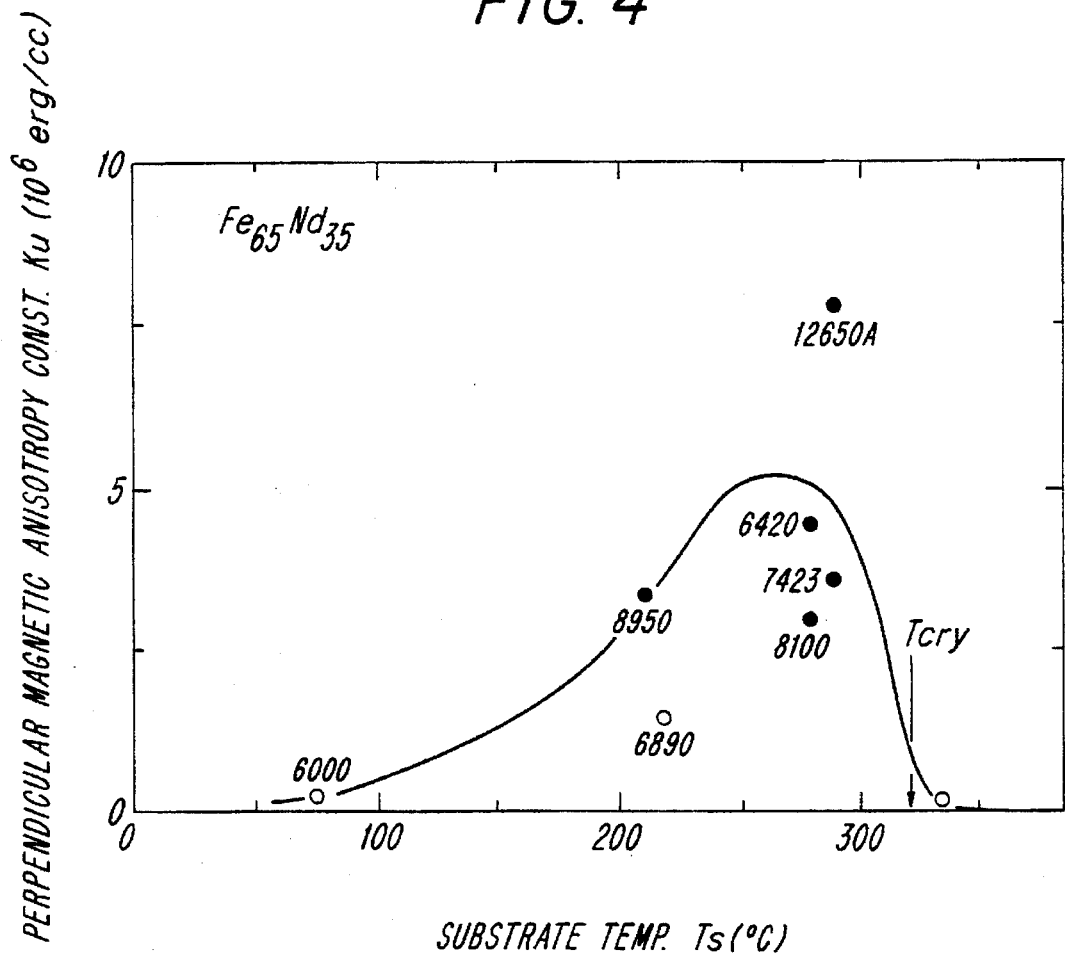
FIG. 4 is a graph showing the relationship between substrate temperature Ts and perpendicular magnetic anisotropy constant Ku in a $Fe_{65}Nd_{35}$ system.

FIG. 4 shows the dependence of the perpendicular magnetic anisotropy constant Ku upon the substrate temperature in $Fe_{65}Nd_{35}$. This curve clearly indicated that the anisotropy constant Ku is near its maximum between 260° and 290° C. Further, the black circles represent that the samples are perpendicularly anisotropic, and the white circles represent that the samples are not perpendicularly anisotropic (but in-plane anisotropic), the numerals near the circles designate the thickness (Å) of the sample films. Furthermore, this curve indicates that if the substrate temperature Ts exceeds the crystallization temperature Tcry (about 320° C.), the perpendicular magnetic anisotropic characteristics are not present (Ku is almost zero).

Figure 5:
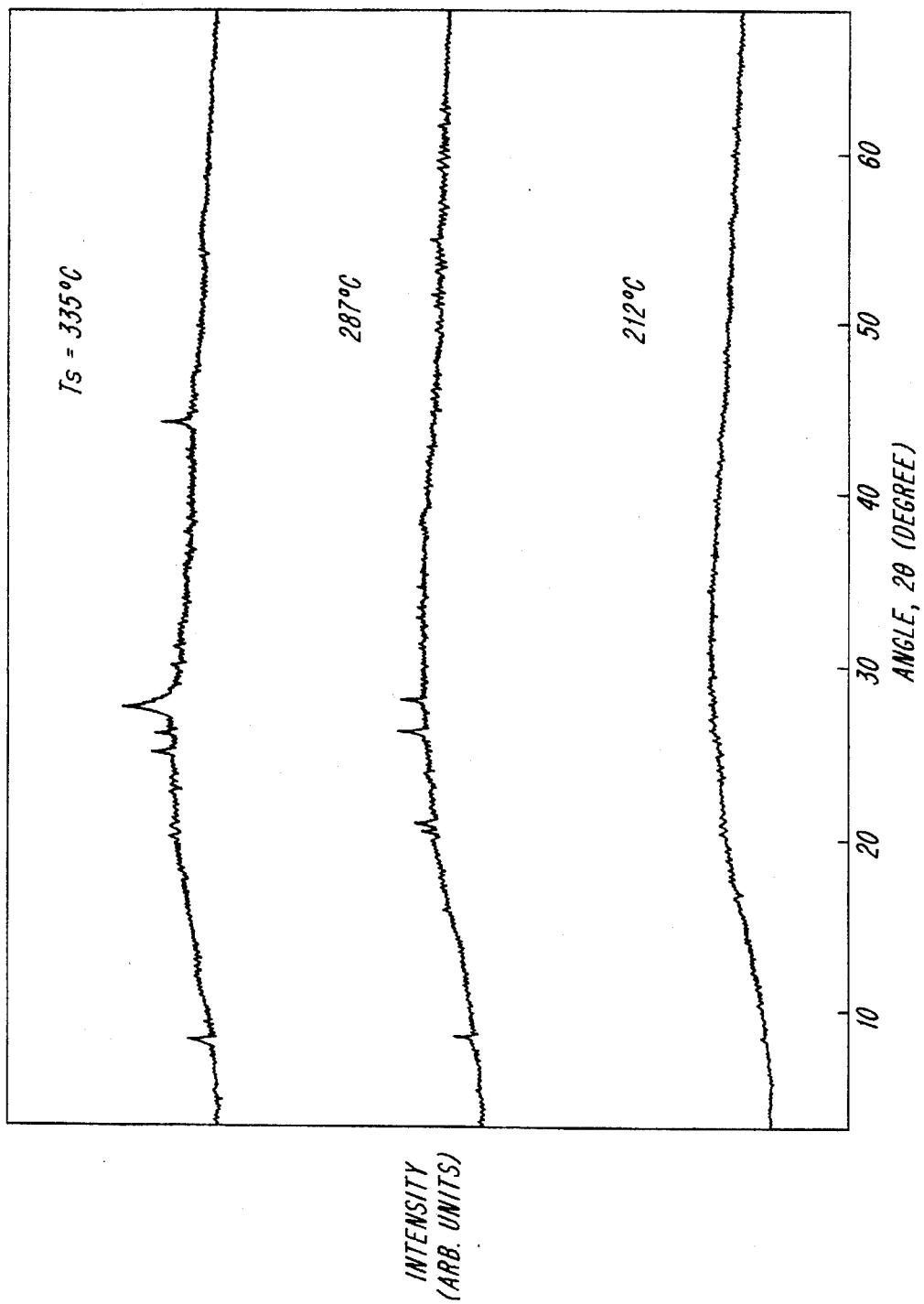
FIG. 5 is X-ray diffraction patterns in $Fe_{65}Nd_{35}$ at different substrate temperatures Ts of $212°$ C., $287°$ C. and $335°$ C.

In the thin film according to the present invention, amorphous phase or microfine-crystalline phase of about a few to about 100 Å in the average is desirable; that is, it is desirable that there exist no crystal grain boundaries which will cause noise as already explained. FIG. 5 shows the intensity of X-ray diffraction patterns at different temperatures as a function of an angle 2θ. These patterns indicate that the intensity curves have some sharp peaks at Ts=335° C. but almost no sharp peaks at Ts=212° C., which represents that the film is generally amorphous. Additionally, a high resolution electron microscopic observation confirms that there exist microfine crystal-crystalline grains when the substrate temperature Ts is at 212° C. or 287° C., but to some extent grown crystalline grains when at 335° C., which demonstrates the crystal grain size hereinabove mentioned is desired.

Figure 6:
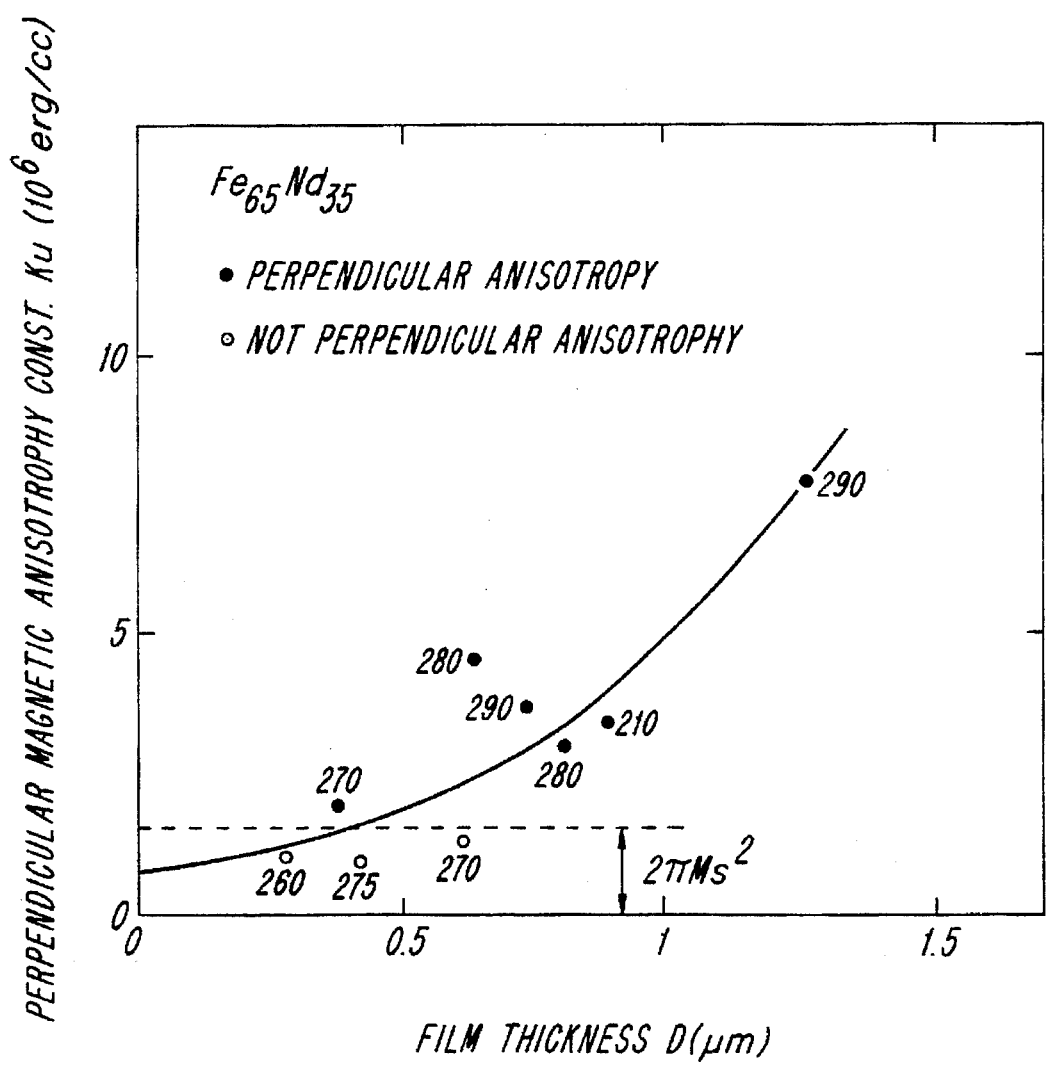
FIG. 6 is a graph showing the relationship between film thickness D and perpendicular magnetic anisotropy constant Ku in $Fe_{65}Nd_{35}$.

The perpendicular magnetic anisotropy constant Ku increases with increasing thickness of the film. However, if the thickness D exceeds 3 μm, it is not preferable from the standpoint of productivity, because it becomes difficult to form a uniform film. FIG. 6 shows the dependence of the anisotropy constant Ku upon film thickness D, which indicates that the perpendicular magnetic anisotropy constant Ku larger than 2 $Ms^2$ can be obtained at a thickness D of 0.3 µm or more, and $Ku \geq 2.5 \times 10^6$ erg/cc can be obtained when the thickness D exceeds about 0.7 µm. In FIG. 6, the black circles represent that the film is of perpendicular anisotropy while the white circles represent that the film is not of perpendicular anisotropy. Further, the numerals near circles designate substrate temperature Ts(°C.).

The thin film according to the present invention can be formed in accordance with a metal gas deposition (or so-called vapor deposition) technique; that is, by any of vacuum deposition method, PVD such as sputtering, ion plating, etc., CVD or the like. In the case of the sputtering method, preferably, the samples are fabricated within an argon Ar atmosphere under pressure of about $2 \times 10^{-1}$ Torr.

Figure 7:
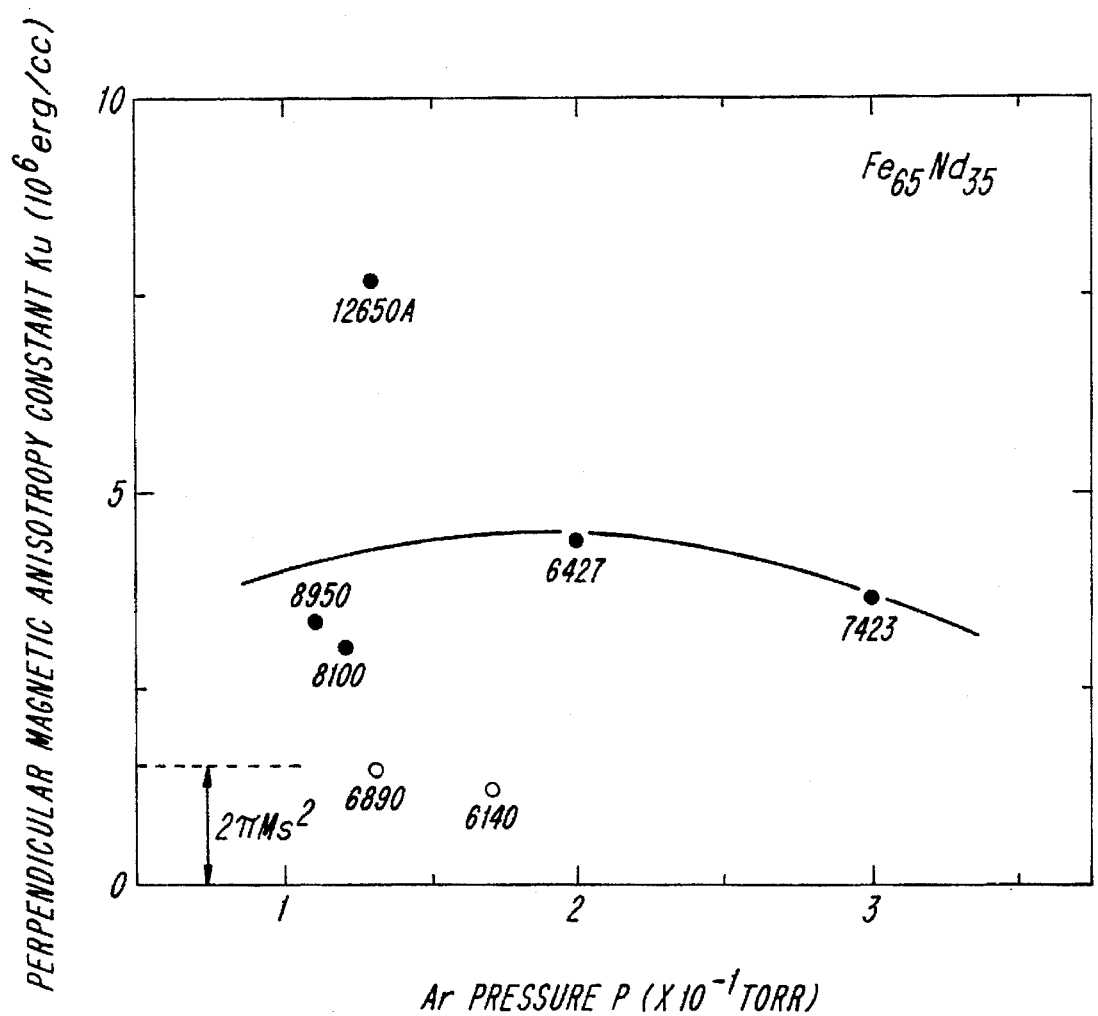
FIG. 7 is a graph showing the relationship between argon pressure P within the vessel and perpendicular magnetic anisotropy constant Ku in $Fe_{65}Nd_{35}$.

FIG. 7 shows the dependence of the anisotropy constant Ku upon Ar pressure. Similarly, the black circles represent that the samples are perpendicular anisotropy while the white circles represent that the samples are not perpendicular anisotropy; the numeral s near the circles represent film thickness (A). FIG. 7 indicates that the change in Ar pressure P has a relatively less influence upon the Ku than other factors such as the substrate temperature or the film thickness D.

In sputter-depositing the material onto the substrate, it is preferred to apply a magnetic field of a few to several tens Oe to the substrate in the direction perpendicular thereto. This magnetic field can readily be obtained by passing a direct current to a solenoid of a sheath wire for heating wound in a coil and disposed under the film substrate.

Figure 9C:
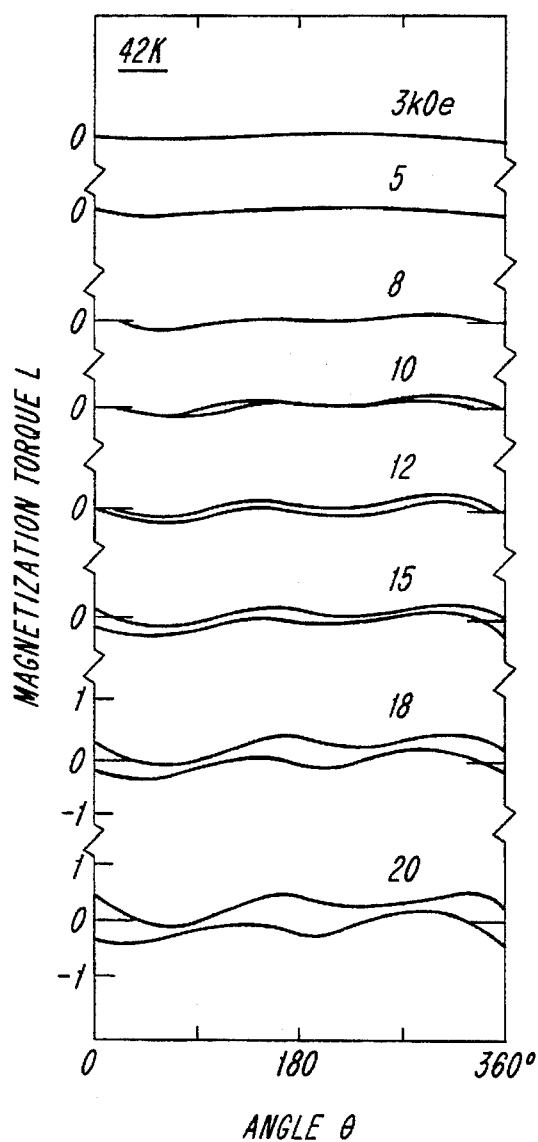
FIGS. 9C, 9D, and 9E are graphs showing the relationship between magnetization torque L and the angle θ under various magnetic fields from 3 to 20 kOe (0.24 to $1.6\times10^6$ A/m) at three different temperatures of 4.2 K. ($-269°$ C.), 77 K. ($-196°$ C.) and 300 K. ($27°$ C.) in $Fe_{60}Nd_{40}$.
Figure 9D:
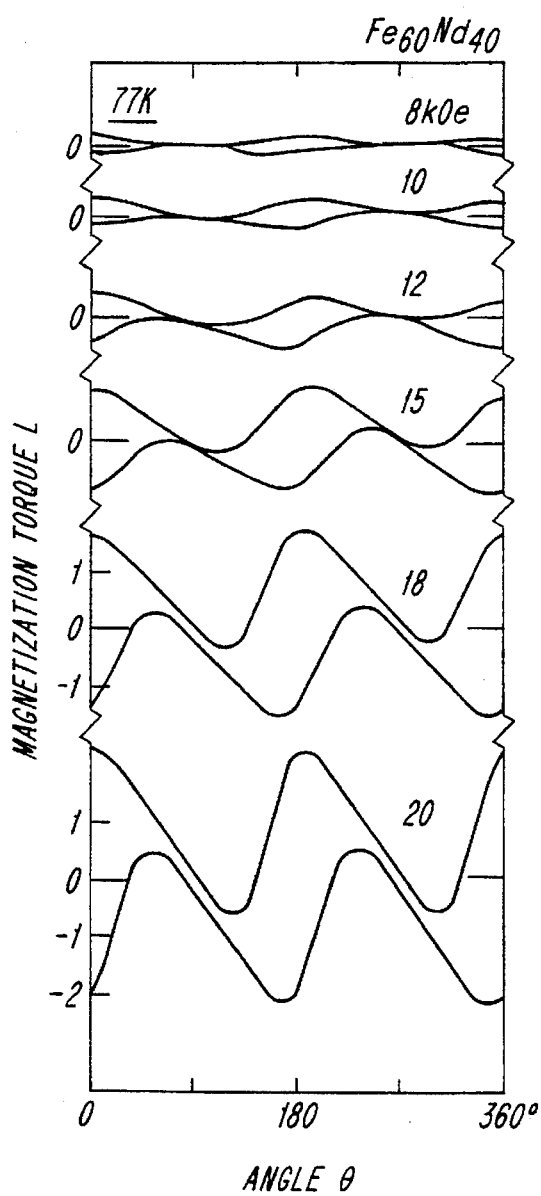
Figure 9E:
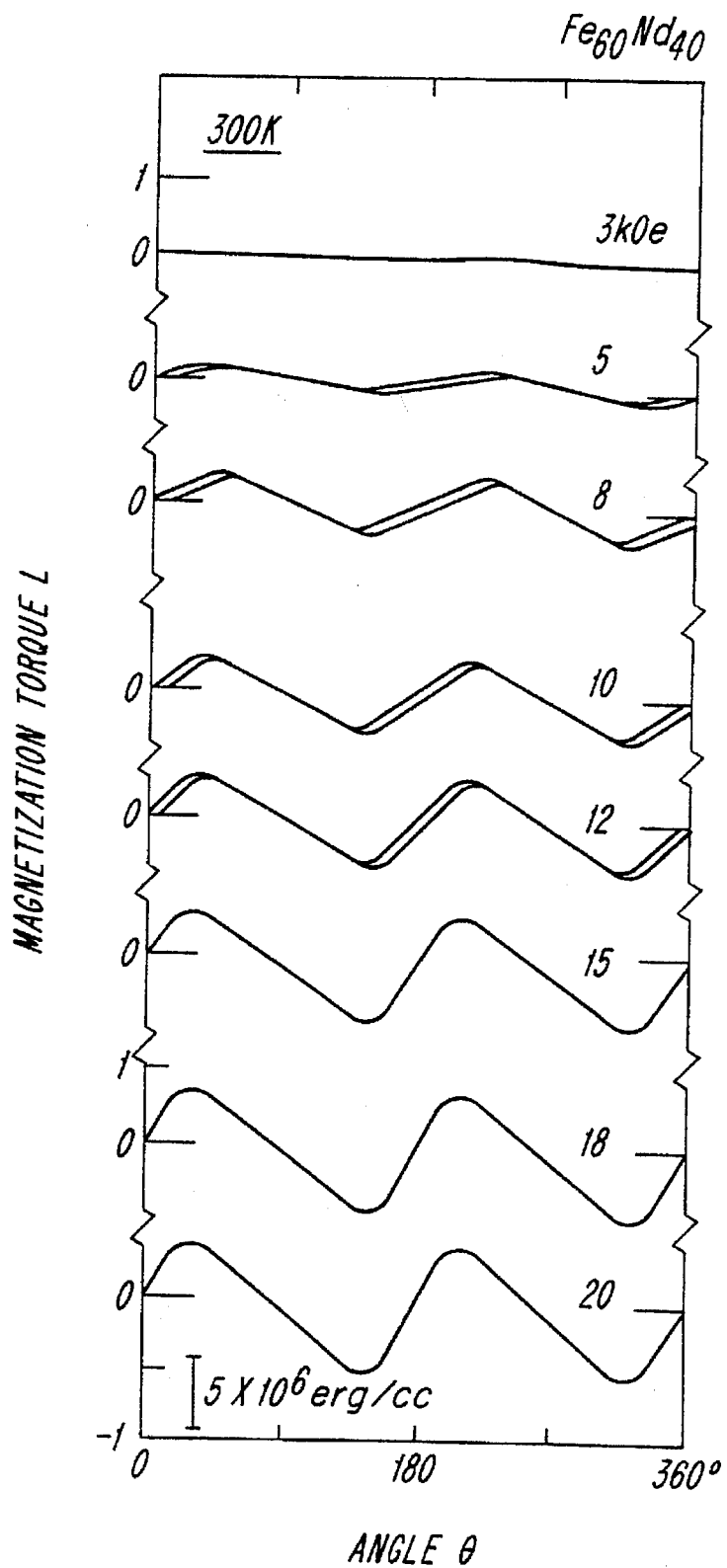

In order to understand the origin of the perpendicular magnetic anisotropy, the temperature dependence of Ku was examined on $Fe_{60}Nd_{40}$ and $Fe_{65}Nd_{35}$. FIGS. 9C, 9D and 9E are examples of the torque curves measured in various field at 42, 77 and 300 K. Here, θ is the angle between the field direction and a direction in the film plane, (Thus θ=0 is the direction in the film plane.) The torque curves at 300 K. indicate that the easy axis for magnetization is along the direction normal to the film plane (θ=90°). Also, very little rotational hysteresis loss is found at 20 kOe at 300 K.

FIGS. 9A and 9B show a sequence of torque curves obtained at more various temperatures in H=15 kOe to show in more detail the change in torque curves with temperature. It is seen that both the torque amplitude and the rotational hysteresis loss W increase with decreasing temperature down to about 84 K. and then decrease. It should also be noted here that the slope at θ=0 change its sign from positive to negative with decreasing temperature from about 80 to 4.2 k.

However, since the thin film according to the present invention is provided with relatively large saturation magnetization Ms, when used as a magneto-optic disk for thermo-magnetic writing of data, it is possible to reduce the magnitude of magnetic field to be applied from the outside, because the leak magnetic flux coming from the surroundings can effectively be utilized.

Figure 10:
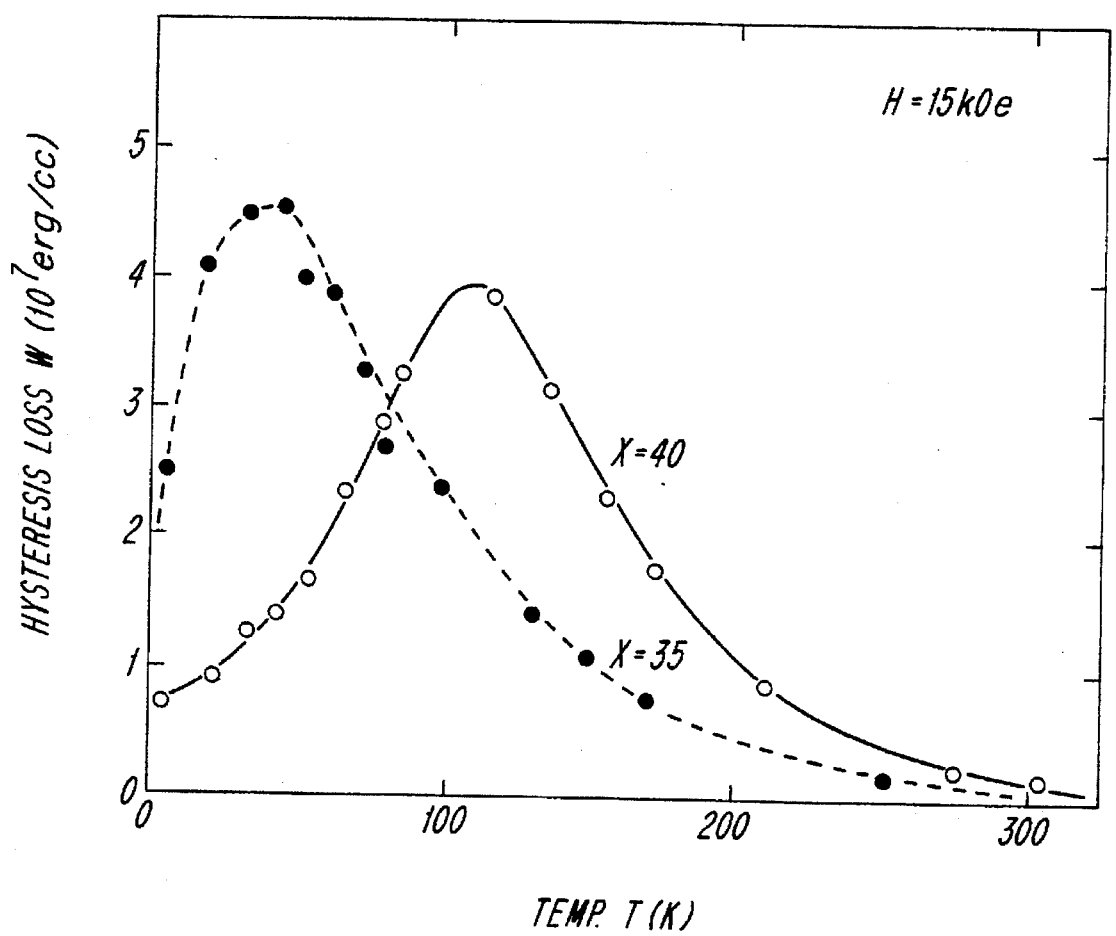
FIG. 10 is a graph showing the relationship between temperature T and hysteresis loss W within a magnetic field of 15 kOe in $Fe_{65}Nd_{35}$ and $Fe_{60}Nd_{40}$.

FIG. 10 shows the perpendicular magnetic anisotropy constant Ku and the hysteresis loss W at low temperatures. The Ku increases with decreasing temperature and reaches its maximum $3 \times 10^7$ erg/cc near liquid nitrogen temperature of 80 K. (−193° C.). Also, the hysteresis loss W reaches its maximum at 100 K. (−173° C.) or less.

Figure 11:
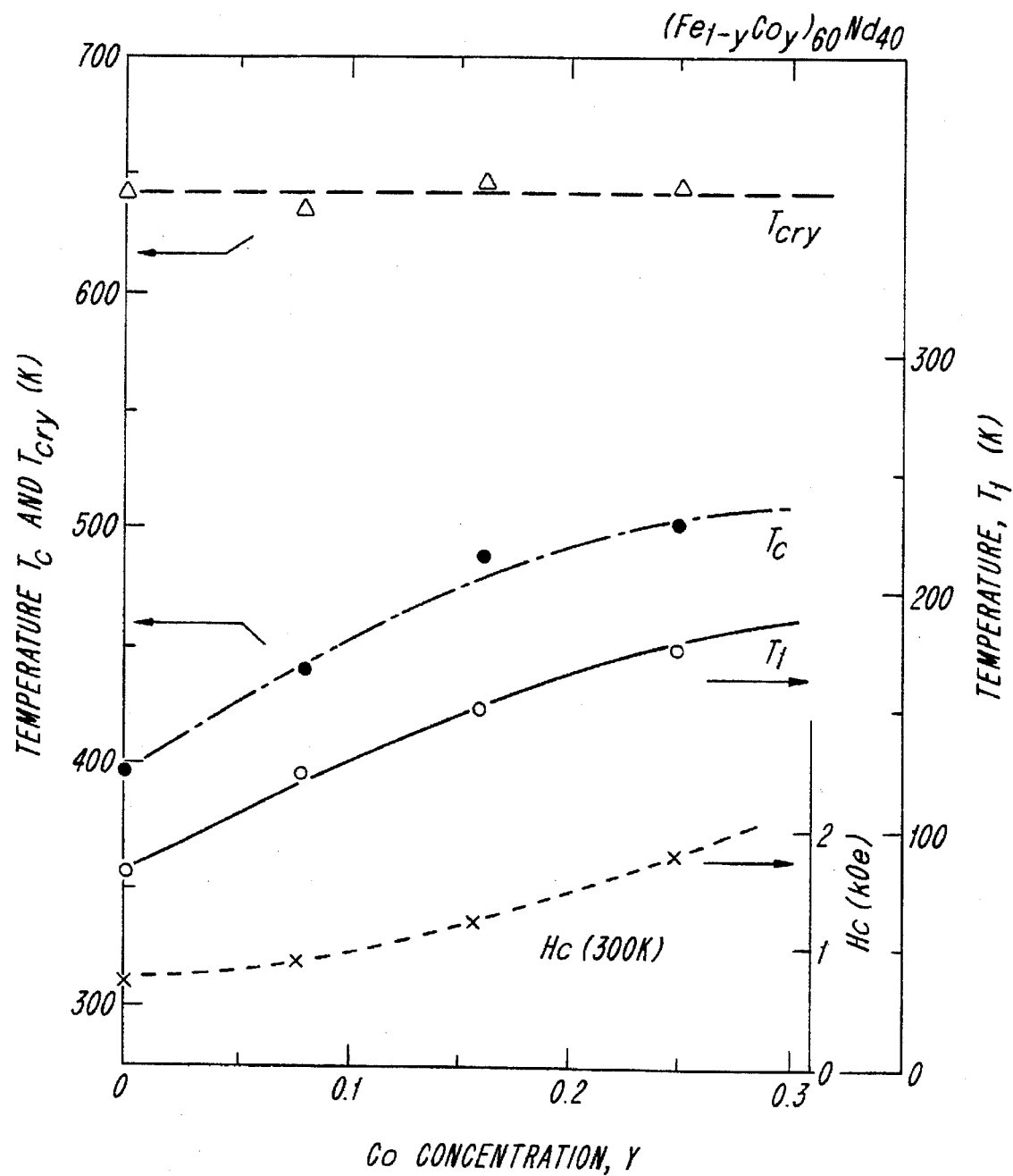
FIG. 11 is a graph showing the relationship between Curie temperature Tc, crystallization temperature Tcry, magnetic anisotropy transition temperature $T_1$, a relative Co concentration y versus Fe in $(Fe_{1-y}Co_y)_{60}Nd_{40}$ and coercivity Hc.

FIG. 11 shows temperature characteristics of the thin film including Co, in particular. This graphical representation indicates that the addition of Co increases the Curie temperature Tc and the temperature $T_1$ at which the perpendicular magnetic anisotropy constant Ku attains a maximum value (i.e., it is believed to be a transition temperature at which the magnetic anisotropy transforms from unidirectional characteristic perpendicular to film plane to cone characteristic), without increasing the crystallization temperature Tcry.

EXAMPLES

The various characteristics of various embodiments of the perpendicular magnetic or magneto-optic recording medium according to the present invention will be described hereinbelow with reference to the drawings again. The test samples were all fabricated on glass substrates within an Ar atmosphere in accordance with a rf sputtering method. Before introducing the Ar gas, the pressure within the sputter vessel is evacuated down to $5 \times 10^{-7}$ Torr ($3.7 \times 10^{-9}$ Pa) or less. The sputtering speed was was approximately 2 µm/h. No bias voltage was applied to the sample substrate during the sputtering process. The substrates were heated by adjusting the magnitude of current passed through a heater coil disposed under the substrate. The heater coil comprised cylindrical a copper bobbin, the outer circumference of which was wound by a sheath wire. Since a direct current was applied through the heater coil, a magnetic field of a few to several tens Oe was applied to the substrate.

The magnetic anisotropy of the test samples was measured by a high sensitivity type torque magnetometer having fields of 20 kOe ($1.6 \times 10^6$ A/m), and the saturation magnetization by a vibrating sample magnetometer (VSM). The microstructure of the thin film was analyzed by X-ray diffractomentry on the basis of Cu-Kα radiation and high resolution transmission electron microscopy. The intrinsic perpendicular magnetic anisotropy constant Ku was derived from the relation between $(L/H)^2$ vs L, where L is the torque amplitude obtained at the external field H applied at 450 with respect to the film plane. (Here Ku is defined as $Ku = K\perp + 2\pi Ms^2$, where $K\perp$ is the observed anistropy from the torque, and Ms is the saturation magnetization.)

Example 1

Five $Fe_{100-x}Nd_x$ thin films (where x=18, 30, 35, 38 and 40) were formed on glass substrates under the following conditions: the Ar pressure was 1 to $2 \times 10^{-1}$ Torr (13.3 to 26.6 Pa); the substrate temperature Ts was 220° to 290° C.; and the film thickness D was 0.5 to 1.2 µm.

The dependence of the magnetization M is upon temperature T shown in FIG. 1 with different values of Nd content x. The dependence of the Curie temperature Tc, the crystallization temperature Tcry and the saturation magnetization Ms upon the Nd content x is shown in FIG. 2, respectively. The detailed discussion of these figures have already been made hereinabove, therefore being omitted here. FIG. 2 is based on Example 1, as discussed previously. FIG. 2 also shows that Ms at 77 K. and 300 K. depends upon the composition Fe—Nd. At a Nd content of 21 at % or more the temperature difference (Tcry-Tc) amounts to at least about 50° C., while at 30 at % or more the difference amounts to 200° C. or more.

The magnetization M was measured within a magnetic field of 10 kOe ($8 \times 10^5$ A/m) after the samples have been magnetized to the saturation point in the direction of easy axis of magnetization. To measure the magnetization M, a vibrating sample type magnetometer was used. The Curie temperatures Tc were obtained from points of intersection between the extrapolation curve $M^2/T$ (where M is the magnetization and T is the temperature) and the horizontal temperature axis. To obtain the magnetization curve, the temperature was increased gradually as shown by the solid lines in FIG. 1. The dashed lines show the magnetization curves obtained when the temperature was lowered from a high temperature more than 1000 K. (727° C.).

Example 2

Three $Fe_{100-x}Nd_x$ thin films (where x=30, 35 and 40) were formed by sputtering under the following conditions: Ar pressure was 1 to $2 \times 10^{-1}$ Torr (13.3 to 26.6 Pa); and Ts was 240° to 290° C.

The magnetic characteristics of the sputtered film were measured at 77 K. (−196° C.) and 300 K. (27° C.) in a directions perpendicular ($\perp$) and parallel (//) to the film plane, and are shown in FIG. 3, which shows perpendicular anisotropy as discussed previously.

The Kerr rotation angle θk was measured on this film to be 0.3 degree which is substantially equivalent to that of the heavy rare earth-iron perpendicular magnetic film.

Example 3

Various $Fe_{60}Nd_{35}$ thin films were formed under the following conditions: Ar pressure was 1 to $2 \times 10^{-1}$ Torr (13.3 to 26.6 Pa); thickness D was 6000 to 12650 Å (0.6 to 1.26 µm); and Ts was 70° to 330° C. Ku was measured by a torque meter.

The dependence of the uniaxial perpendicular magnetic anisotropy constant Ku upon the substrate temperature Ts is shown in FIG. 4. This figure indicates that the black circles indicative of perpendicular anisotropy lie above Ku=1.5× $10^6$ erg/cc and between Ts=200° and 300° C. and that the maximum Ku lies between Ts=260 and 290° C. The white circles indicate that it is not of perpendicular anisotropy. If the substrate temperature Ts is above the crystallization temperature Tcry (=about 320° C.), it provides no perpendicular magnetic film. Further, the X-ray diffraction patterns at Ts=212°, 287° and 335° C. are shown in FIG. 5. At Ts of 335° C. and 287° C., sharp peaks appear which are believed to correspond those of $Nd_2Fe_{17}$ or Nd. As discussed previously, the electron microscopy revealed that the presence of an amorphous matrix and the average grain size of microfine-crystallite ranging from about a few Å to about 100 Å is suitable.

Example 4

Various $Fe_{65}Nd_{35}$ thin films were formed under the following conditions: Ar pressure was 1 to $2 \times 10^{-1}$ Torr (13.3 to 26.6 Pa); Ts was 210° to 290° C.; and D was varied. Ku was derived from measured values obtained by a torque meter.

The dependence of the anisotropy constant Ku upon film thickness D is shown in FIG. 6, wherein black circles represent perpendicular anisotropy and white circles represent in-plane anisotropy. This figure indicates that a thickness D of 0.3 µm or more is necessary to obtain Ku larger than 2 $\pi Ms^2$, and D of 0.7 µm or more is necessary for Ku of at least $2.5 \times 10^6$ erg/cc.

Example 5

Various $Fe_{65}Nd_{35}$ thin films were formed under the following conditions: Ts was 210° to 290° C.; D was 6140 to 12650 Å (0.6 to 1.2 µm), and Ar pressure was varied.

The dependence of the anisotropy constant Ku upon Ar pressure is shown in FIG. 7. This figure indicates that the Ar pressure exerts a less influence upon Ku than other factors such as Ts or D.

Example 6

Various $Fe_{100-x}Nd_x$ thin films (where x=18 to 50) were formed under the following conditions: Ar pressure was 1 to $3 \times 10^{-1}$ Torr (13.3 to 39.9 Pa); Ts was 250° to 280° C.; and D was 6000 to 13000 Å (0.6 to 1.3 µm).

Figure 8:
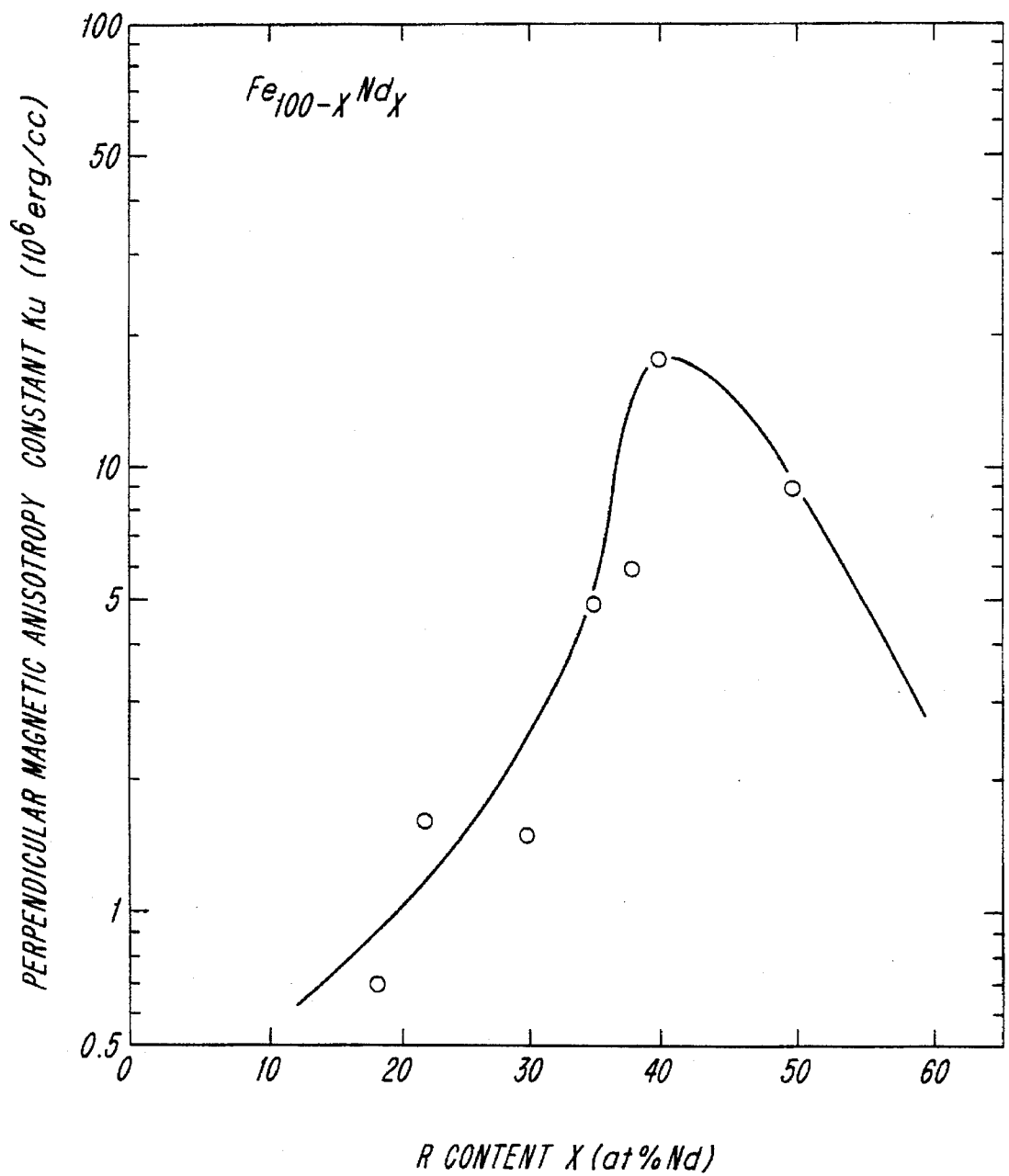
FIG. 8 is a graph showing the relationship between Nd content x and perpendicular magnetic anisotropy constant Ku in $Fe_{100-x}Nd_x$.

The dependence of the anisotropy constant Ku upon Nd content x is shown in FIG. 8. The Ku reaches its maximum value of 1 to $2 \times 10^7$ erg/cc near $Nd_{40}$. As the Nd amount decreases therefrom, Ku rapidly decreases thus Ku drops down below $2.5 \times 10^6$ erg/cc at a Nd amount of less than 31 at %. This curve indicates that when the R content lies between 33 and 55 atomic percent, the Ku is within a preferable range of $3 \times 10^6$ erg/cc or more. Further, in FIG. 8, each plotted value is an average of several test samples fabricated at different times. At 21 at % Nd, the film shows perpendicular magnetic anisotropy.

Example 7

Various $Fe_{60}Nd_{35}M_5$ thin films (where M is at least one of Ni, Zr, Nb, V, Ta, Cr, Mo, W, Mn, Bi, Al, Si, Pb, Sb, Ge and Sn) are formed under the following condition: Ar pressure is 1 to $2 \times 10^{-1}$ Torr (13.3×26.6 Pa); Ts is 220° to 290° C.; and D is 6300 to 11000 Å (0.6 to 1.1 µm). It is possible to obtain perpendicular magnetic anisotropy for each test sample.

Example 8

An $Fe_{40}Co_{25}Nd_{35}$ thin film was formed under the following conditions: Ar pressure was $2 \times 10^{-1}$ Torr (26.6 Pa); Ts was 240° C.; and D was 7400 Å (0.74 µm). The anisotropy constant Ku was $2.5 \times 10^6$ erg/cc or more.

Example 9

An $Fe_{60}Nd_{25}Pr_{15}$ thin film was formed under the following conditions: Ar pressure was 1.5 to $2 \times 10^{-1}$ Torr (19.5 to 26.6 Pa); Ts was 260° C.; and D was 7900 Å (0.79 µm). The anistropy constant Ku was $2.5 \times 10^6$ erg/cc or more.

Example 10

Three thin films of $Fe_{60}Nd_{32}Dy_8$, $Fe_{58}Nd_{32}Ce_{10}$ and $Fe_{57}Nd_{30}Co_{10}V_3$ were formed under the following conditions: Ar pressure was 1 to $2 \times 10^{-1}$ Torr (13.3 to 26.6 Pa); Ts was 240° to 290° C.; and D was 7300 to 11000 Å (0.73 to 1.1 µm). The anisotropy constants Ku thereof were each $2.5 \times 10^6$ erg/cc or more.

Example 11

Two $Fe_{65}Nd_{35}$ and $Fe_{60}Nd_{40}$ thin films were formed under the following conditions: Ar pressure was $2 \times 10^{-1}$ Torr (26.6 Pa); Ts was 290° C. and 250° C., respectively; and D was 12650 Å (1.26 µm), and 4860 Å (0.48 µm), respectively.

The torque curves in $Fe_{60}Nd_{40}$ measured at 4.2 to 300 K. are shown in FIGS. 9A–9E. Further, the hysteresis loss W at low temperatures in both films is shown in FIG. 10.

Example 12

Four $Fe_{60-y}Co_yNd_{40}$ thin films (where y is 0, 5, 10 and 15) were formed under the following conditions: Ar pressure was 1 to $2 \times 10^{-1}$ Torr (13.3 to 26.6 Pa); Ts was 220° to 270° C.; and D was 5000 to 8200 Å (0.5 to 0.82 µm).

The change in the Curie temperature Tc, the crystallization temperature Tcry, the temperature $T_1$ at which the perpendicular anisotropy constant Ku depicts a maximum, and the coercivity Hc is shown in FIG. 11, respectively, as a function of the Co content y. As the Co amount increases, Tc, Hc and $T_1$ increase without changing Tcry.

Example 13

Figure 12:
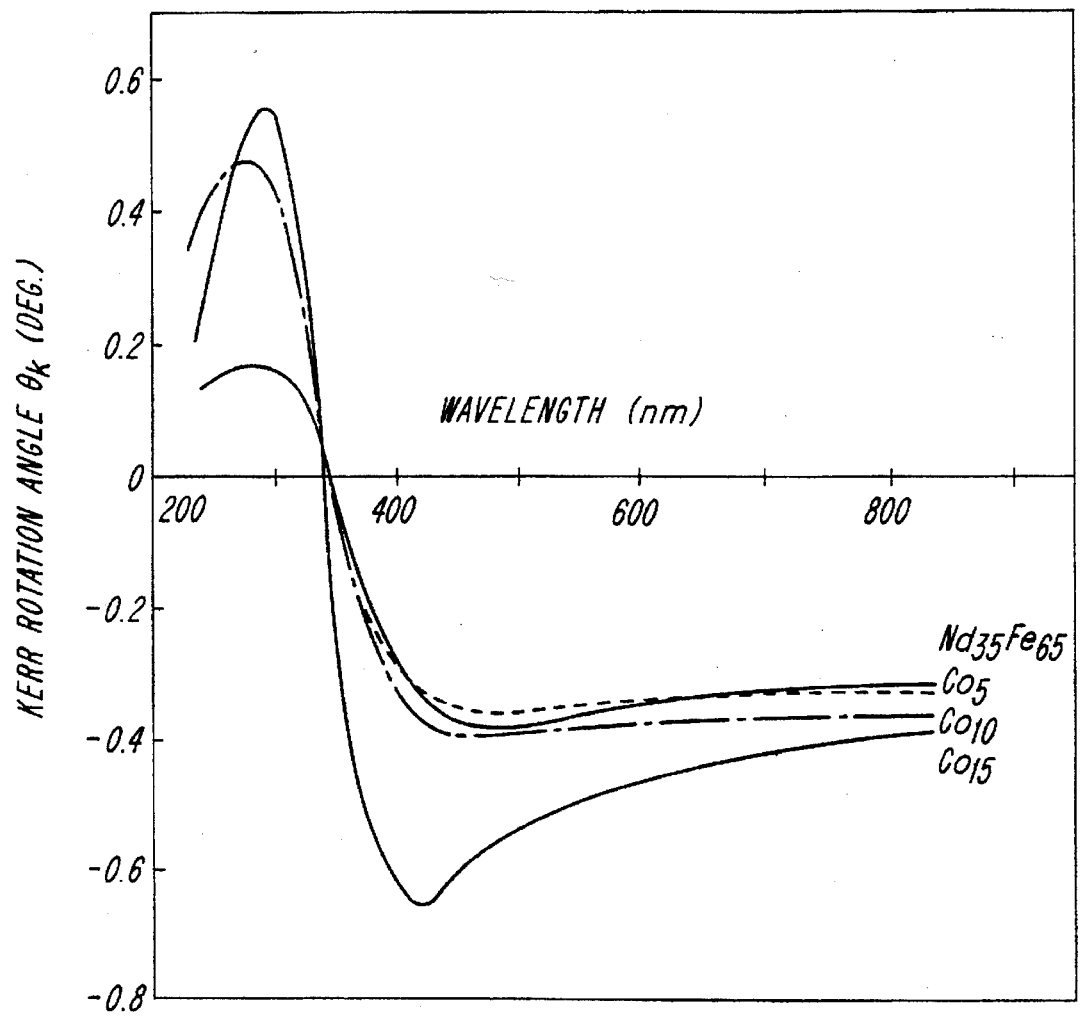
FIG. 12 is a graph showing the dependence of Kerr rotation angle θk (degree) upon wavelength of light (nm) of $Nd_{35}Fe_{65}$ and $(Fe_{1-y}Co_y)_{60}Nd_{40}$.

The Kerr rotation angle θk as a function of the wavelength λ was measured on the thin films of $Nd_{35}Fe_{65}$ (Example 1) and $(Fe_{1-y}Co_y)_{60}Nd_{40}$ (Example 13) by applying a linearly polarized ray (light source of a Hg lamp, wavelength λ=230 to 830 nm, without half-mirror) with an incident light angle of 80 degrees onto the surface of the thin film, wherein the measurement was effected on the surface side of the films by using a "Magneto-Optical Instrument J-250" manufactured by Japan Spectroscopy Co., Ltd. The result is shown in FIG. 12, in which Co 5, Co 10 and Co 15 represent y=0.083, 0.17 and 0.25 respectively.

The Kerr rotation angle θk is positive at a low wavelength below λ=340 nm, approximately zero at 340 nm, and negative at a higher wavelength than 340 nm. The absolute Kerr rotation angle |θ| rapidly increases above λ=340 nm and reaches a roughly constant high level at λ above 500 nm. The |θk| values show maximum values around λ=400 to 500 nm.

Figure 13:
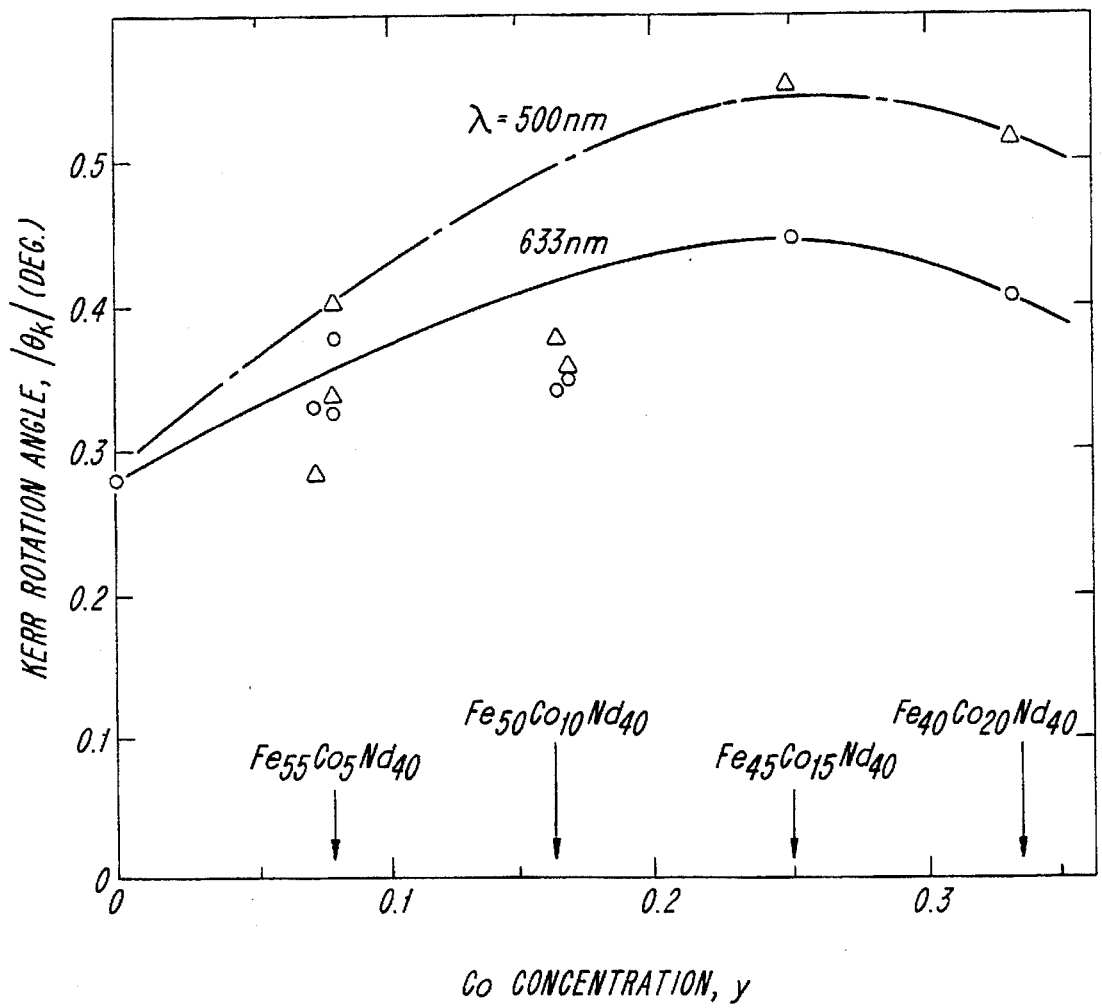
FIG. 13 is a graph showing Kerr rotation angle |θk| of a sputtered thin film of $(Fe_{1-y}Co_y)_{60}Nd_{40}$ as a function of a relative Co concentration y.

FIG. 13 shows the change of the Kerr rotation angle |θk| as a function of the Co concentration y for $(Fe_{1-y}Co_y)_{60}Nd_{40}$ at λ=500 and 633 nm to illustrate its dependence upon the composition. |θk| increases as the Co concentration y increases, depicting a peak around y=0.25. At y=0.25 the Kerr rotation angle is 0.55 degree for λ=500 nm, and 0.45 degree for λ=633 nm, which are significantly larger than those attained by the Gd—Fe—Co system. Co is effective at 0.1%, too.

Example 14

Figure 14A:
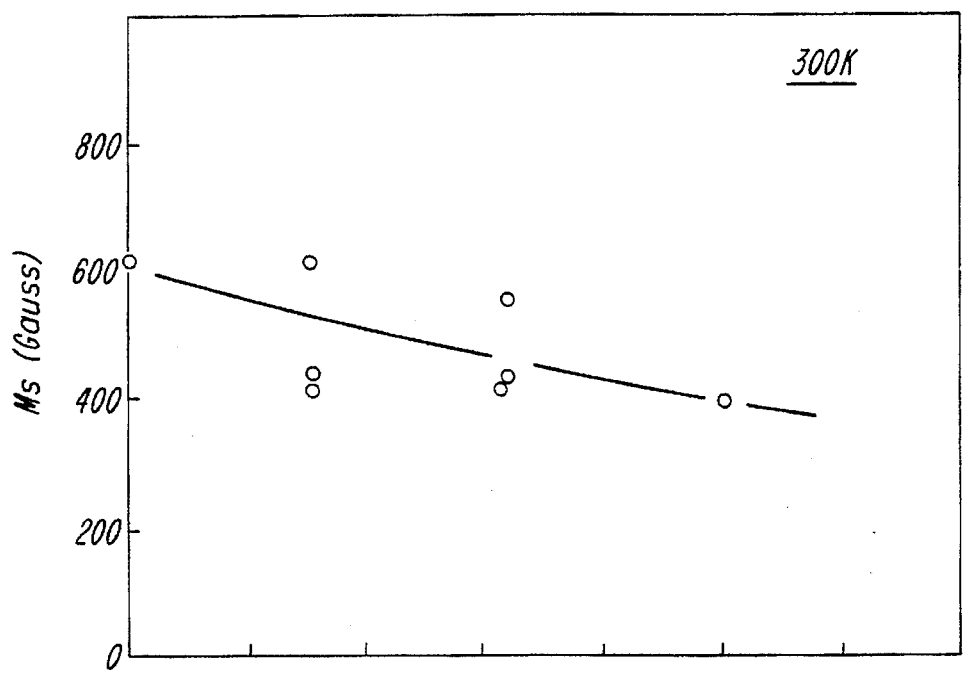
FIGS. 14A and 14B are graphs showing saturation magnetization Ms and perpendicular magnetic anisotropy constant Ku of $(Fe_{1-y}Co_y)_{60}Nd_{40}$.
Figure 14B:
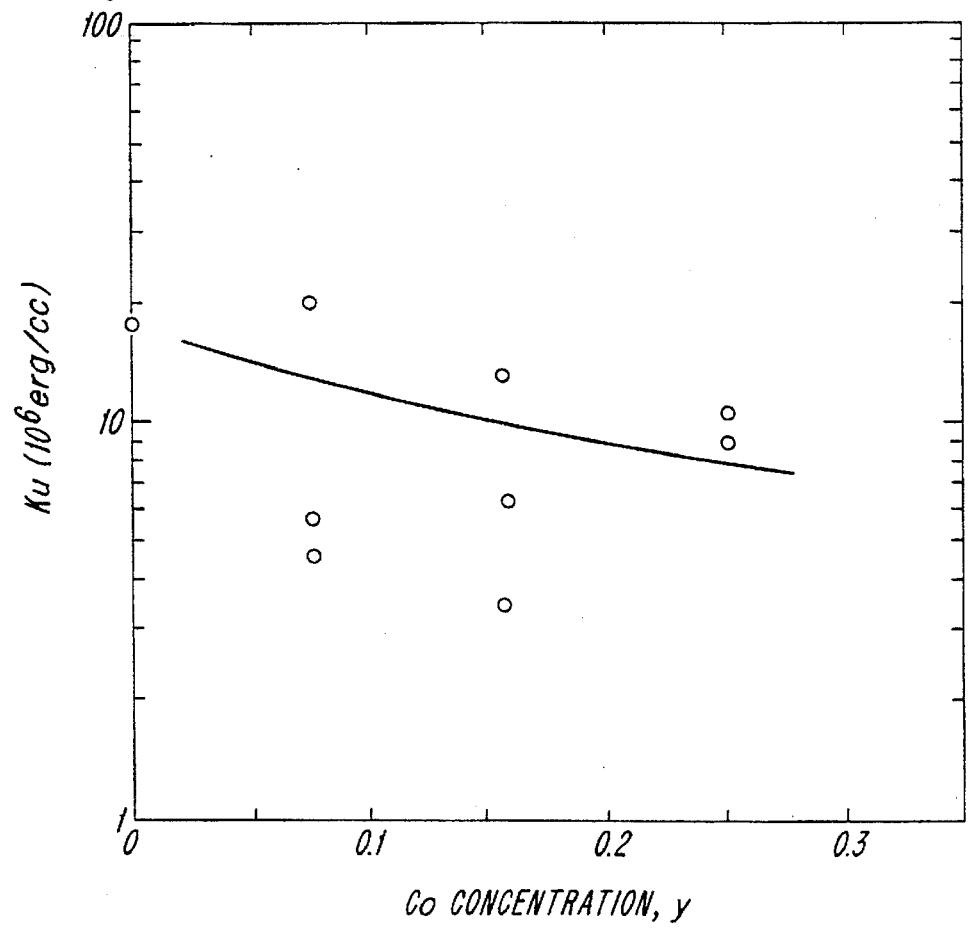

By using the same samples employed in Example 13, the saturation magnetization Ms and the perpendicular magnetic anisotropy constant Ku at 300 K. were measured and the results are shown in FIG. 14. As the amount of Co substituted for Fe increases, the Ms and Ku decrease.

Example 15

Figure 15:
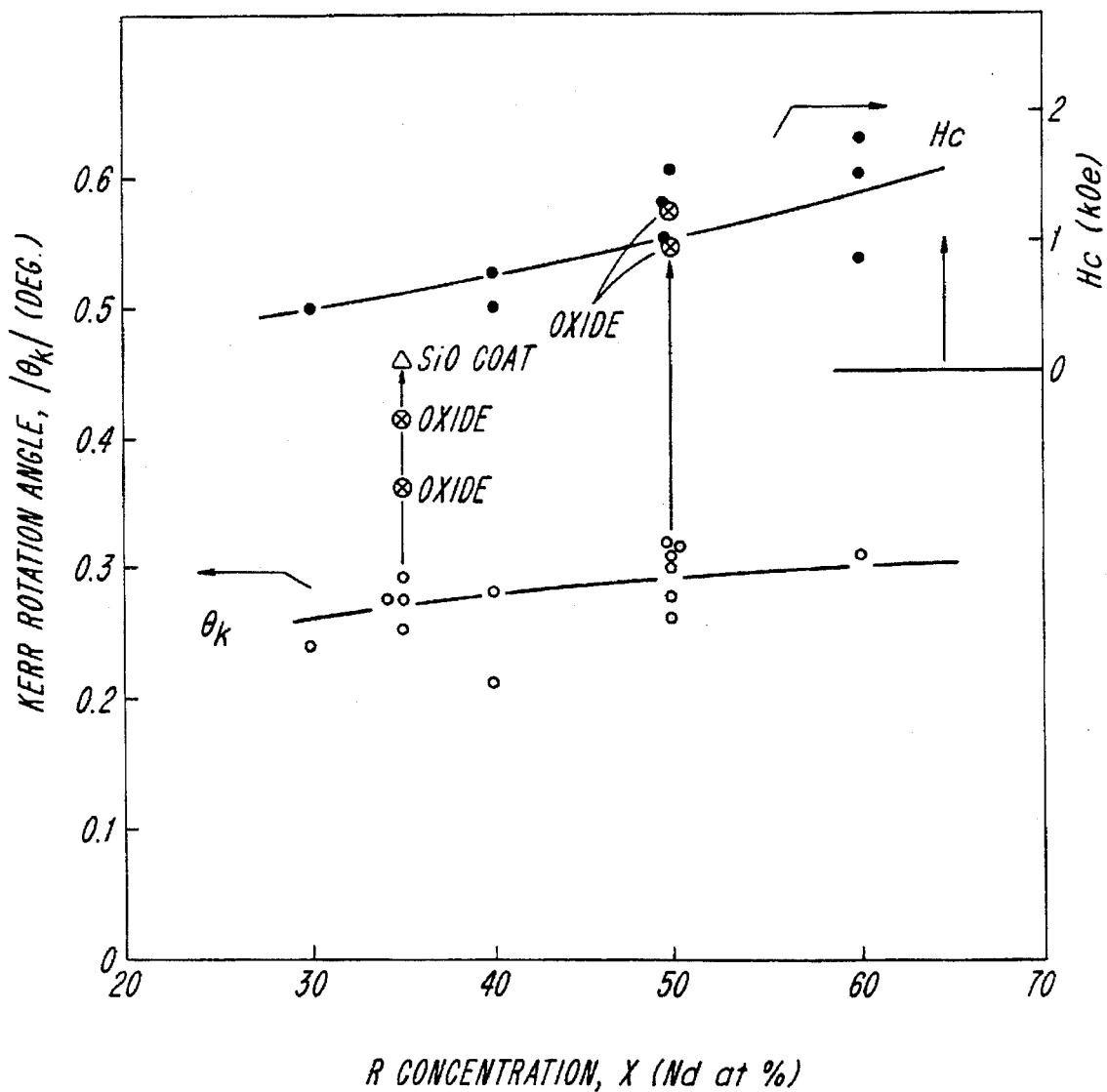
FIG. 15 is a graph showing Kerr rotation angle |θk| (degree) and coercivity Hc, and increase thereof due to oxidization in the film surface of $Fe_{100-x}Nd_x$.

Sample thin films of $Fe_{100-x}Nd_x$ prepared under the same conditions as Example 1 were measured for θk and coercivity Hc (kOe), which are shown in FIG. 15.

Additional oxidizing treatment of the thin film surface was carried out on the samples of x=35 and 50 at %, respectively, to oxidize the surface in the depth of about 100 to about 300 Å just after the thin film had been prepared, whereby the Kerr rotation angle significantly increased as shown by arrows in FIG. 15. For instance at a Nd concentration x=50 at %, θk increased from 0.3 to about 0.6 degrees; i.e., by about twice. It is believed that the surface oxidation serves to increase the effective Kerr rotation angle due to an occurrence of multiple interference through the contribution of the Kerr effect and Faraday effect.

The surface oxidization treatment was effected by maintaining the film on the substrate at a temperature of 100°–150° C. within the sputter vessel for a half to one hour after sputtering.

The surface oxidization is more convenient in preparation than the coating treatment such as SiO-coating or the like applied onto (above) the film surface, since in the oxidization treatment the film surface in situ can be subjected to oxidization. The present invention provides a great advantage in this respect over the prior art. Further, such oxidized layer can serve as a protective layer of the base thin film.

SiO coating (thickness of 1200 Å) was also applied on the freshly prepared thin film of the same sample (x=35 at %), and the result is shown in FIG. 15. The SiO coating can increase the Kerr rotation angle, too. This means the conventional or additional treatment or layer provision can further increase the Kerr rotation angle θk, which is also counted as an advantage of the present invention.

SiO coating or any other coating may be applied on the oxidized layer hereinabove mentioned too.

Example 16

Figure 16:
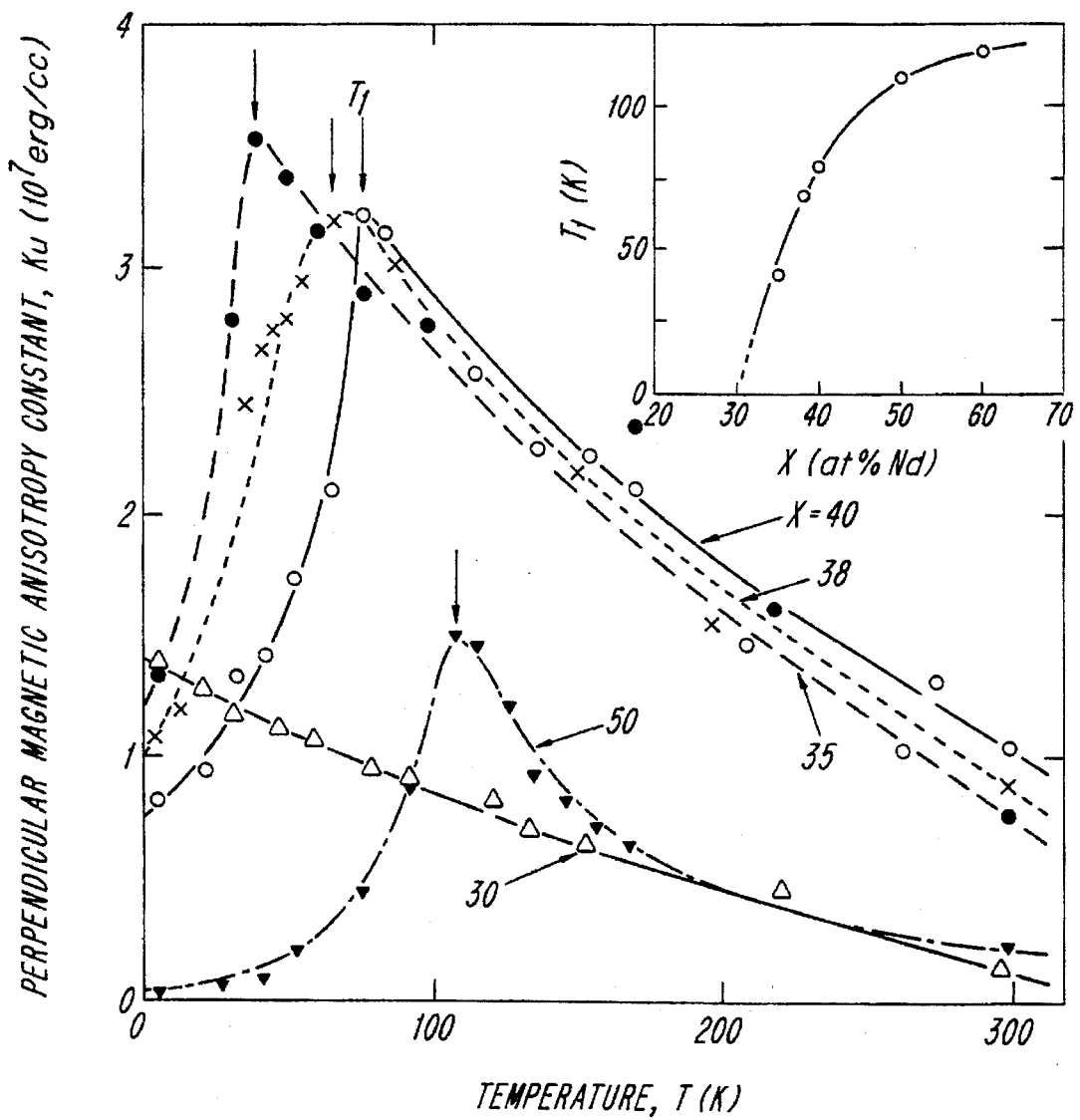
FIG. 16 is a graph shying temperature-related changes the perpendicular magnetic anisotropy constant Ku ($10^7$ erg/cc) of $Fe_{100-x}Nd_x$ (x=30, 35, 38, 40, 50)

The change of the perpendicular magnetic anisotropy constant Ku as a function of temperature was measured on the same samples as Example 16, and the result is shown in FIG. 16. Ku generally increases as the temperature decreases to depict a maximum value at a temperature $T_1$, and decreases thereafter (i.e., the temperature becomes still lower).

The peak temperature $T_1$ for Ku shifts as a function of the composition (e.g., Nd concentration x at %), which is also shown in FIG. 16, at the upper right corner.

Example 17

A writing test laser beam was carried out by using a sample film of $Nd_{38}Fe_{62}$ prepared in the same manner as Example 1, and having a thickness of about 4000 Å (0.4 μm) under the following conditions:

laser: semiconductor laser (power 20 mW);

bias magnetic field: about 100 Oe; and writing: line writing method.

The result was observed through polarizing microscopy based on the Kerr effect to show that bits with a width of about 2 to 10 μm have been recorded. It should be noted, however, the width per one bit memory may be further improved based on the thin films of the present invention by applying various improvement in the writing devices and systems, too.

Furthermore, it should be understood that any additional measures such as coating or surface treatment other than those disclosed herein may be applied without departing from the gist of the present invention.

Example 18

Figure 17:
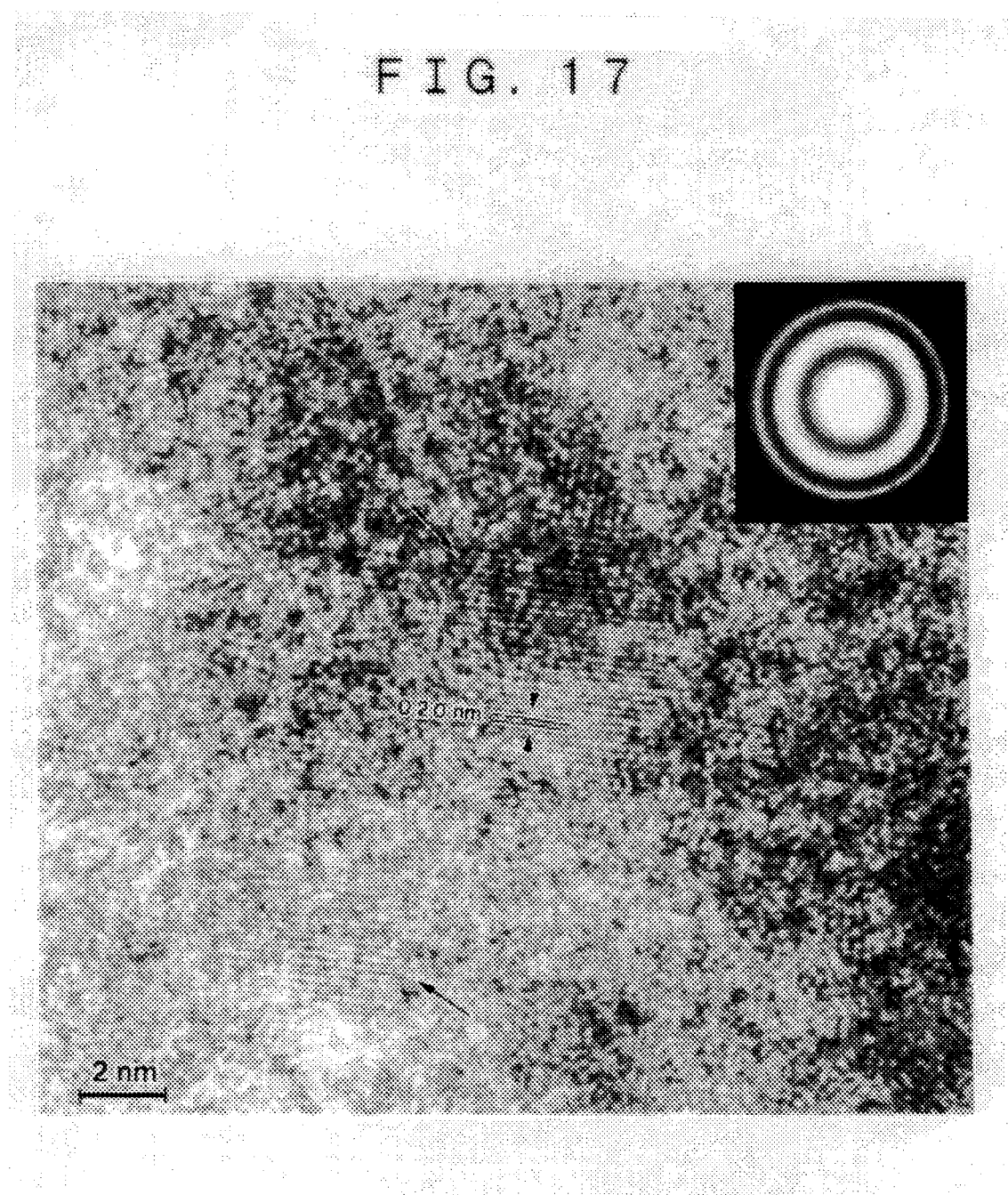
FIG. 17 is a high resolution electron micrograph of a 150 Å thick $Fe_{60}Nd_{40}$ film deposited on a substrate at $220°$ C.

A 150 Å thick $Fe_{60}Nd_{40}$ film was made on a cleaved rocksalt substrate at Ts of 220° C., and a high resolution transmission electron micrograph thereof is shown on FIG. 17. There is clearly observed a lattice image of a 0.2 nm spacing. The average size of such a region (clusters) varies from place to place (2–10 nm), however, on the average of about 3–5 nm. This feature was also found in most of the films examined in the present invention.

Namely, though the X-ray diffraction patterns show an amorphous state, it is concluded that some sort of a short range atomic ordering is present in the amorphous matrix in the Fe—Nd or (Fe, Co)—Nd alloy systems, which gives rises to a lattice image. Thus the region of the perpendicular magnetic anisotropy is strongly suggested to be associated with an anisotropic arrangement in such structure.

Example 19

Thin films of a composition $Fe_{45}Co_{15}Nd_{35}M_5$ wherein M was one of Zr, Hf, V, Nb, Ta, Cr, Mo, Al and Ti are made to a film thickness of 5300 to 12000 Å under the conditions of Ts=210°–285° C. and an Ar pressure of $1$–$2 \times 10^{-1}$ Torr, and the magnetic properties are measured. Each sample shows the perpendicular magnetic anisotropy having a Ku value of $2.5 \times 10^{-6}$ erg/cc or more, and a Kerr rotation angle θk of 0.4 degree or more.

Example 20

(Anticorrosion test)

Films obtained in Examples 1, 7, 13 and 19 having the compositions of $Fe_{65}Nd_{35}$, $Fe_{60}Nd_{35}M_5$ (M=Zr, Hf, V, Nb, Ta, Cr, Mo, Al, Bi, Mn, Sb, Ge, Sn, Pb, Ni and Si), $Fe_{45}Co_{15}Nd_{40}$ and $Fe_{45}Co_{15}Nd_{35}M_5$ (M=Zr, Hf, V, Nb, Ta, Cr, Mo, Al Ti, Pb, Ni and Si) are immersed in a one N NaCl aqueous solution for 20 minutes, then subjected to aging for 2 hours at 85° C. and 85% RH (relative humidity). The resultant films are observed by an optical microscope with respect to corrosion or pin holes.

The FeCoNdM films show excellent corrosion resistance against pin hole corrosion, wherein a better corrosion resistance is shown with FeCoNd, then FeMdM (M=Zr, Hf, Nb, Ta, Cr, Mo, Al, Ni and Si) in this order, while FeNd and FeNdM (M=Bi, Mn, Sb, Ge and Sn) shows a worst pin hole corrosion.

Example 21

Figure 18:
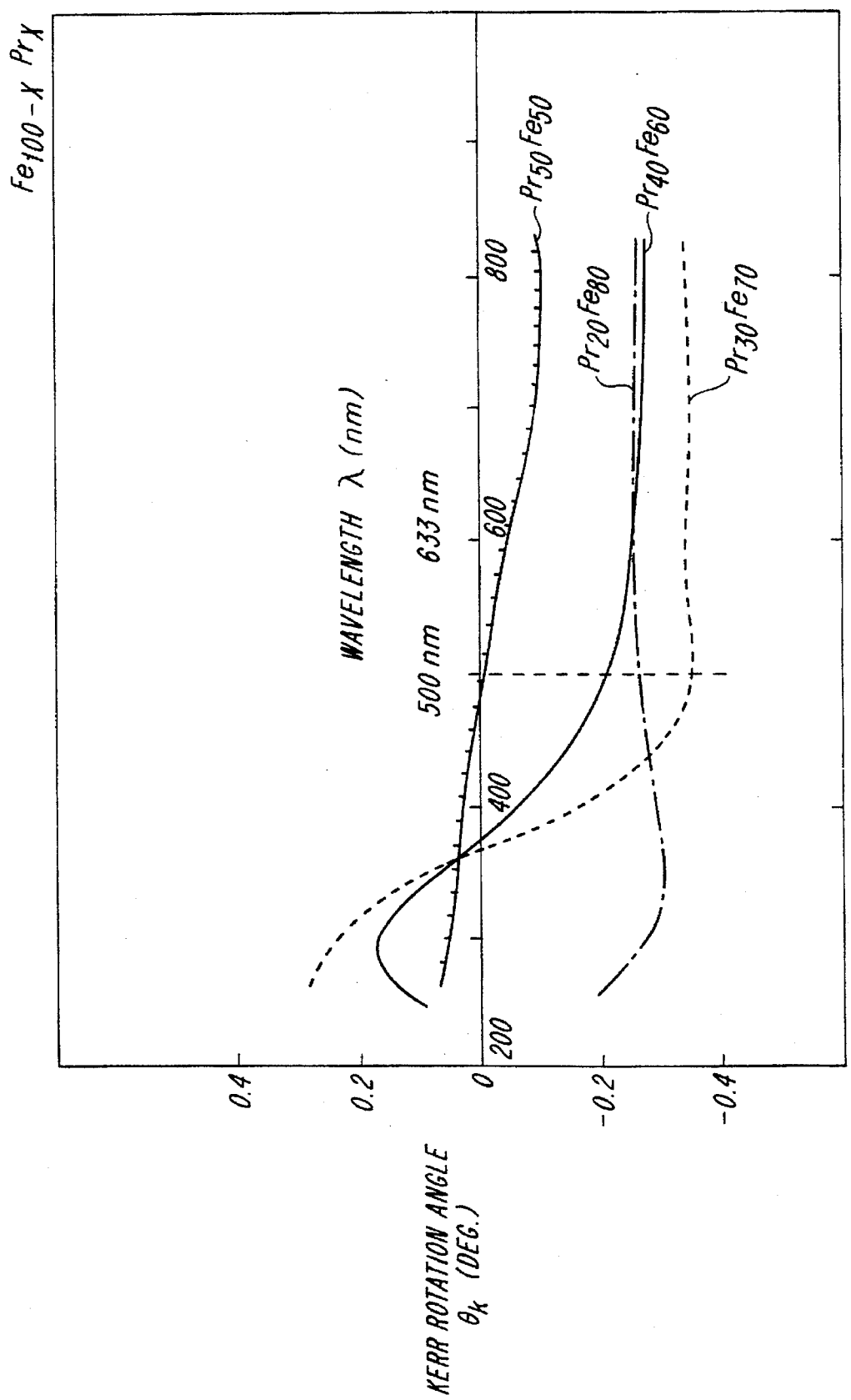
FIG. 18 is a graph shying Kerr rotation angle θk vs wavelength λ for $Fe_{100-x}Pr_x$ (x=20–50) films.
Figure 19:
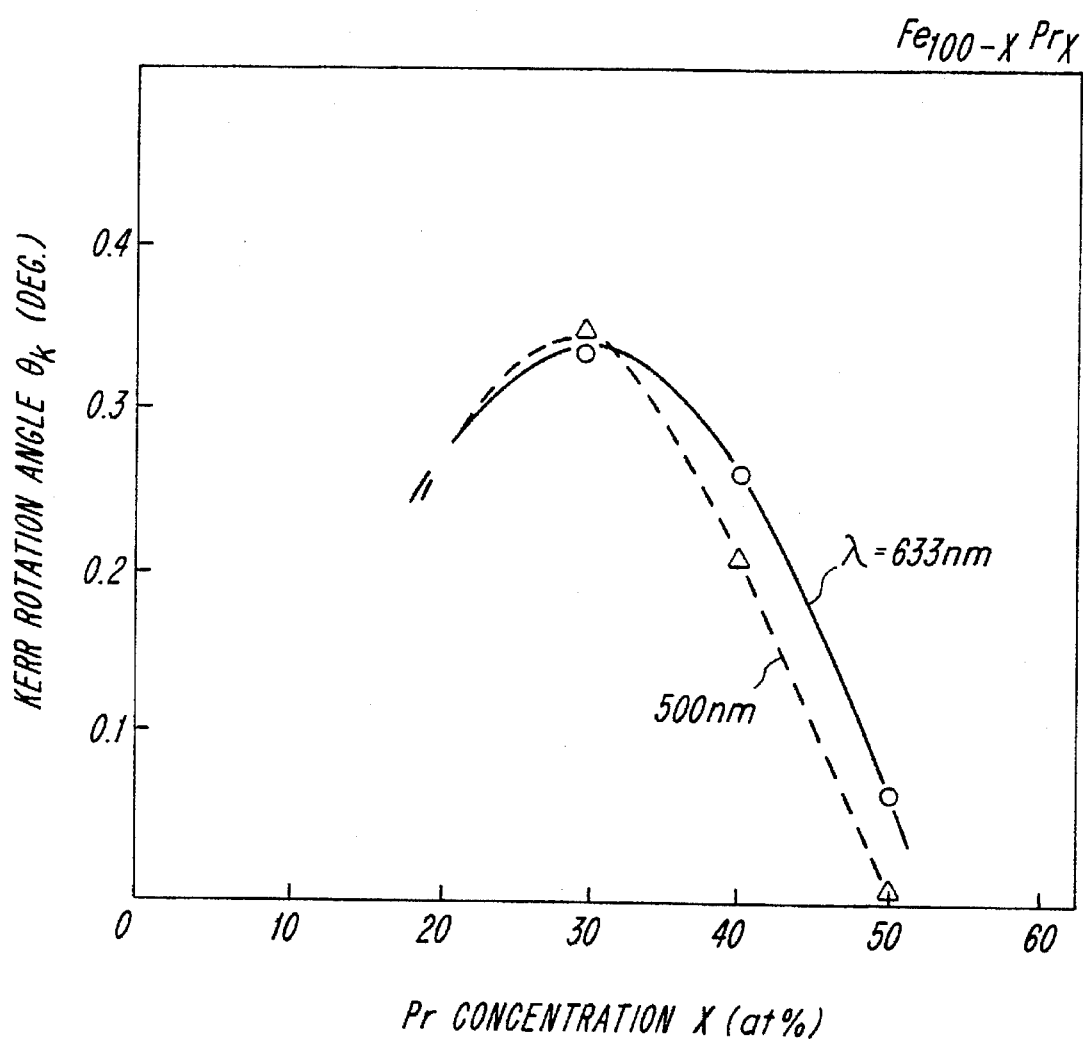
FIG. 19 is a graph showing Kerr rotation angle θk (degree) of $Fe_{100-x}Pr_x$ films as a function of Pr concentration x (at %) at different wavelength λ=633 and 500 nm.

Sputtered films having compositions of $Fe_{100-x}Pr_x$ (x=20–50) were produced under the conditions of: Ar pressure at $2 \times 10^{-1}$ Torr, Ts each at 290° C. and 270° C., and D each at 8200 Å (0.82 μm) and 9400 Å (0.94 μm). The resultant thin films were measured for Kerr rotation angle θk as a function of the wavelength λ of the incident light in the same manner as Example 13. The result is shown in FIG. 18. A maximum θk of 0.35 degree is obtained at λ about 500 nm for $Fe_{70}Pr_{30}$. Change of the Kerr rotation angle θk (degree) measured at different wavelength kλ=633 and 500 nm is shown in FIG. 19 as a function of Pr concentration x (at %).

It will be understood by those skilled in the art that the foregoing description is in terms of preferred embodiments of the present invention wherein various changes and modifications may be made without departing from the spirit and scope of the present invention as disclosed herein and set forth in the claims.

What is claimed:

1. A perpendicular magnetic recording medium having perpendicular magnetic anisotropy at room or higher temperature and a temperature difference of at least about 50° C. between the crystallization temperature Tcry and the Curie temperature Tc, and comprising a thin film consisting essentially of:
   a) 21 to 60 atomic percent rare earth elements R wherein Nd, Pr or a mixture thereof is present in an amount of at least 21 atomic percent, the balance of said R being one or more selected from the group consisting of Y, La, Ce, Sm, Gd, Tb, Dy, Ho, Er and Yb; and
   b) the balance being Fe wherein the thin film has a perpendicular anisotropy greater than 2 $\pi Ms^2$ wherein Ms represents saturation magnetization and comprises a microfine-crystalline phase having an average crystal grain size of at least about 20 angstroms and being oriented to provide perpendicular magnetic anisotropy.

2. A perpendicular magnetic recording medium having perpendicular magnetic anisotropy at room or higher temperature and a temperature difference of at least about 50° C. between the crystallization temperature Tcry and the Curie temperature Tc, and comprising a thin film consisting essentially of:
   a) 21 to 60 atomic percent rare earth elements R wherein Nd, Pr or a mixture thereof is present in an amount of at least 21 atomic percent, the balance of said R being one or more selected from the group consisting of Y, La, Ce, Sm, Gd, Tb, Dy, Ho, Er and Yb; and
   b) the balance being Fe and Co wherein Co amounts to less than 30 atomic percent of the sum of Fe and Co counted as the balance wherein the thin film has a perpendicular anisotropy greater than 2 $\pi Ms^2$ wherein Ms represents saturation magnetization and comprises a microfine-crystalline phase having an average crystal grain size of at least about 20 angstroms and being oriented to provide perpendicular magnetic anisotropy.

3. A perpendicular magnetic recording medium having perpendicular magnetic anisotropy at room or higher temperature and a temperature difference of at least about 50° C. between the crystalline temperature Tcry and the Curie temperature Tc, and comprising a thin film consisting essentially of:
   a) 21 to 60 atomic percent rare earth elements R wherein Nd, Pr or a mixture thereof is present in an amount of at least 21 atomic percent, the balance of said R being one or more selected from the group consisting of Y, La, Ce, Sm, Gd, Tb, Dy, Ho, Er and Yb; and
   b) not exceeding 10 atomic percent of one or more selected from the group consisting of Ni, Zr, Nb, V, Ta, Cr, Mo, W, Mn, Bi, Al, Pb, Sb, Ge, Sn, Si and Hf; and
   c) the balance being Fe wherein the thin film has a perpendicular anisotropy greater than 2 $\pi Ms^2$ wherein Ms represents saturation magnetization and comprises a microfine-crystalline phase having an average crystal grain size of at least about 20 angstroms and being oriented to provide perpendicular magnetic anisotropy.

4. A perpendicular magnetic recording medium having perpendicular magnetic anisotropy at room or higher temperature and a temperature difference of at least about 50° C. between the crystallization temperature Tcry and the Curie temperature Tc, and comprising a thin film consisting essentially of:
   a) 21 to 60 atomic percent rare earth elements R wherein Nd, Pr or a mixture thereof is present in an mount of at least 21 atomic percent, the balance of said R being one or more selected from the group consisting of Y, La, Ce, Sm, Gd, Tb, Dy, Ho, Er and Yb;
   b) not exceeding 10 atomic percent of one or more selected from the group consisting of Ni, Zr, Nb, V, Ta, Cr, Mo, W, Mn, Bi, Al, Pb, Sb, Ge, Sn, Si, Ti and Hf; and
   c) the balance being Fe and Co wherein Co amounts to less than 30 atomic percent of the sum of Fe and Co counted as the balance wherein the thin film has a perpendicular anisotropy greater than 2 $\pi Ms^2$ wherein Ms represents saturation magnetization and comprises a microfine-crystalline phase having an average crystal grain size of at least about 20 angstroms and being oriented to provide perpendicular magnetic anisotropy.

5. A method of producing a perpendicular magnetic recording medium having perpendicular magnetic anisotropy at room or higher temperature and on a substrate comprising the following steps of:
   a) maintaining a substrate at a temperature between 180° C. and a temperature lower than the crystallization temperature of a material of a thin film to be formed on the substrate; and
   b) forming a thin film having a composition as specified below in the substrate by a metal gas deposition technique:

said composition consisting essentially of:

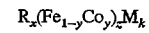

wherein, by atomic percent, x is 21–60%, k is 0–10%, and z is 30–79% provided that y is zero to less than 0.5, wherein 70–100 atomic percent of the entire R consists of Nd, Pr or a mixture thereof, the balance of said R being one or more selected from the group consisting of Y, La, Ce, Sm, Gd, Tb, Dy, Ho, Er and Yb; and wherein said M is at least one selected from the group consisting of Ni, Zr, Nb, V, Ta, Cr, Mo, W, Mn, Bi, Al, Pb, Sb, Ge, Sn, Si, Ti and Hf wherein the thin film has a perpendicular anisotropy greater than $2\pi Ms^2$ wherein Ms represents saturation magnetization.

6. A perpendicular magnetic recording medium having perpendicular magnetic anisotropy at room or higher temperature and a temperature difference of at least about 50° C. between the crystallization temperature Tcry and the Curie temperature Tc, and comprising a thin film consisting essentially of:

wherein, by atomic percent, x is 21–60%, k is 0–10%, and z is 30–79% provided that y is zero to less than 0.3; wherein Nd, Pr or a mixture thereof is present in an amount of at least 21 atomic percent, the balance of said R being one or more selected from the group consisting of Y, La, Ce, Sm, Gd, Tb, Dy, Ho, Er and Yb; and wherein said M is at least one selected from the group consisting of Ni, Zr, Nb, V, Ta, Cr, Mo, W, Mn, Bi, Al, Pb, Sb, Ge, Sn, Si, Ti and Hf; said film comprises an oxide layer to improve the Kerr rotation angle in the surface thereof and wherein the thin film has a perpendicular anisotropy greater than $2\pi Ms^2$ wherein Ms represents saturation magnetization and comprises a microfine-crystalline phase having an average crystal grain size of at least about 20 angstroms and being oriented to provide perpendicular magnetic anisotropy.

7. A method of producing a perpendicular magnetic recording medium having perpendicular magnetic anisotropy at room or higher temperature on a substrate comprising the steps of:
  a) providing a thin film having a composition as specified below on a substrate by a metal gas deposition technique, and
  b) oxidizing the surface of said film to form an oxidized layer which improves the Kerr rotation angle;
  said thin film composition consisting essentially of:

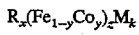

wherein, by atomic percent, x is 21–60%, k is 10–10%, and z is 30–79% provided that y is zero to less than 0.5, wherein 70–100 atomic percent of the entire k consists of Nd, Pr or a mixture thereof, the balance of said R being one or more selected from the group consisting of Y, La, Ce, Sm, Gd, Tb, Dy, Ho, Er and Yb; and wherein said M is at least one selected from the group consisting of Ni, Zr, Nb, V, Ta, Cr, Mo, W, Mn, Bi, Al, Pb, Ge, Sn, Si, Ti and Hf.

8. A perpendicular magnetic recording medium having perpendicular magnetic anisotropy at room or higher temperature and comprising a thin film consisting essentially of:
  a) 31 to 60 atomic percent rare earth elements R wherein 70–100 atomic percent of said R consists of Nd, Pr or a mixture thereof, the balance of said R being one or more selected from the group consisting of Y, La, Ce, Sm, Gd, Tb, Dy, Ho, Er and Yb; and
  b) the balance being Fe wherein the thin film comprises a microfine-crystalline phase having an average crystal grain size of at least about 20 angstroms and wherein the thin film has a perpendicular anisotropy greater than $2\pi Ms^2$ wherein Ms represents saturation magnetization.

9. A perpendicular magnetic recording medium having perpendicular magnetic anisotropy at room or higher temperature and comprising a thin film consisting essentially of:
  a) 31 to 60 atomic percent rare earth elements R wherein 70–100 atomic percent of said R consists of Nd, Pr or a mixture thereof, the balance of said R being one or more selected from the group consisting of Y, La, Ce, Sm, Gd, Tb, Dy, Ho, Er and Yb; and
  b) the balance being Fe and Co wherein Co amounts to less than 30 atomic percent of the sum of Fe and Co counted as the balance wherein the thin film comprises a microfine-crystalline phase having an average crystal grain size of at least about 20 angstroms and wherein the thin film has a perpendicular anisotropy greater than $2\pi Ms^2$ wherein Ms represents saturation magnetization.

10. A perpendicular magnetic recording medium having perpendicular magnetic anisotropy at room or higher temperature and comprising a thin film consisting essentially of:
  a) 31 to 60 atomic percent rare earth elements R wherein 70–100 atomic percent of said R consists of Nd, Pr or a mixture thereof, the balance of said R being one or more selected from the group consisting of Y, La, Ce, Sm, Gd, Tb, Dy, Ho, Er and Yb; and
  b) not exceeding 10 atomic percent of one or more selected from the group consisting of Ni, Zr, Nb, V, Ta, Cr, Mo, W, Mn, Bi, Al, Si, Pb, Ge, Sn and Hf; and
  c) the balance being Fe wherein the thin film comprises a microfine-crystalline phase having an average crystal grain size of at least about 20 angstroms and wherein the thin film has a perpendicular anisotropy greater than $2\pi Ms^2$ wherein Ms represents saturation magnetization.

11. A perpendicular magnetic recording medium having perpendicular magnetic anisotropy at room or higher temperature and comprising a thin film consisting essentially of:
  a) 31 to 60 atomic percent rare earth elements R wherein 70–100 atomic percent of said R consists of Nd, Pr or a mixture thereof, the balance of said R being one or more selected from the group consisting of Y, La, Ce, Sm, Gd, Tb, Dy, Ho, Er and Yb; and
  b) not exceeding 10 atomic percent of one or more selected from the group consisting of Ni, Zr, Nb, V, Ta, Cr, Mo, W, Mn, Bi, Al, Si, Pb, Ge, Sn and Hf; and
  c) the balance being Fe and Co wherein Co amounts to less than 30 atomic percent of the sum of Fe and Co counted as the balance wherein the thin film comprises a microfine-crystalline phase having an average crystal grain size of at least about 20 angstroms and wherein the thin film has a perpendicular anisotropy greater than $2\pi Ms^2$ wherein Ms presents saturation magnetization.

12. A method of producing a perpendicular magnetic recording medium having perpendicular magnetic anisotropy at room or higher temperature on a substrate comprising the following steps of:
  a) maintaining a substrate at a temperature between 180° C. and a temperature lower than crystallization temperature of a material of a thin film to be formed on the substrate; and
  b) forming a thin film having a composition as specified below on the substrate by a metal gas deposition technique:
  said composition consisting essentially of:

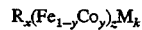

wherein, by atomic percent, x is 31–60%, k is 0–10%, and z is 30–79% provided that y is zero to less than 0.3; wherein 70–100 atomic percent of the entire R consists of Nd, Pr or a mixture thereof, the balance of R being one or more selected from the group consisting of Y, La, Ce, Sm, Gd, Tb, Dy, HO, Er and Yb; and wherein said M is at least one selected from the group consisting of Ni, Zr, Nb, V, Ta, Cr, Mo, W, Mn, Bi, Al, Pb, Ge, Sn, Si, Tn and Hf wherein the thin film has a perpendicular anisotropy greater than $2 \pi Ms^2$ wherein Ms represents saturation magnetization.

13. The recording medium as defined in claim 6, wherein said oxide layer is one or more selected from the group consisting of oxidized layer and oxide coating layer.

14. The recording medium as defined in any one of claims 1–4 or 6, which has a Kerr rotation angle $|\theta_k|$ of at least 0.3 degree.

15. The recording medium as defined in any one of claims 1–4, wherein Fe or the sum of Fe and Co to be counted as the balance is at least 40 atomic percent.

16. The recording medium as defined in claim 6, wherein z is at least 40 atomic percent.

17. The recording medium as defined in any one of claims 1–4 or 6, which has a temperature difference of at least about 100° C. between the crystallization temperature Tcry and the Curie temperature Tc.

18. The recording medium as defined in claim 17, wherein the temperature difference is at least about 200° C.

19. The recording medium as defined in any one of claims 1–4 or 6, wherein R is 33–50 atomic percent.

20. The recording medium as defined in any one of claims 1–4 or 6, wherein the thin film is at least about 0.3 μm thick.

21. The recording medium as defined in any one of claims 1–4 or 6, wherein R is Nd, Pr or a mixture thereof.

22. The method as defined in claim 5, wherein the thin film is formed to a thickness of about 0.3 to about 3 μm.

23. The method as defined in claim 7, wherein the oxidization is effected so as to form the oxidized layer with a thickness up to several tens nm.

24. The recording medium as defined in any one of claims 1–4 or 6, wherein said thin film has been formed on a substrate maintained at a temperature between 180° C. and a temperature lower than the crystallization temperatures of material elements of the film.

25. The recording medium as defined in any one of claims 2, 4 or 6, wherein Co amounts to at least about 8 atomic percent of the sum of Fe and Co to be counted as the balance.

26. The method as defined in claim 5, wherein the substrate is maintained in step a) at a temperature of 200°–300° C.

27. The recording medium as defined in any one of claims 1–4 or 6, wherein R is Pr.

28. The recording mediums as defined in any one of claims 1–4 or 6, where R is a mixture of Nd and Pr.

29. The recording medium as defined in claim 4, wherein R is Nd, and M is V.

30. The recording medium as defined in any of one claims 8–11, which has a perpendicular magnetic anisotropy constant of at least $2.5 \times 10^6$ erg/cc at room temperature.

31. The recording medium as defined in any one of claims 8–11, which has a Kerr rotation angle $\theta_k$ of at least 0.3 degree.

32. The recording medium as defined in any one of claims 8–11, wherein Fe or the sum of Fe and Co to be counted as the balance is at least 40 atomic percent.

33. The recording medium as defined in any one of claims 8–11, which has a temperature difference of at least about 200° C. between the crystallization temperature Tcry and the Curie temperature Tc.

34. The recording medium as defined in any one of claims 8–11, wherein R is contained at 33–50 atomic percent.

35. The recording medium as defined in any one of claims 8–11, wherein the thin film is at least about 0.3 μm thick.

36. The recording medium as defined in any one of claims 8–11, which has temperature difference of at least about 100° C. between the crystallization temperature Tcry and the Curie temperature Tc.

37. The recording as defined in any one of claims 8–11, wherein said microfine-crystalline phase is distributed in an amorphous matrix, said microfine-crystalline phase having an average crystal grain size of not exceeding about 10 nm.

38. The recording medium as defined in claim 8, which has a perpendicular magnetic anisotropy constant of at least $2.5 \times 10^6$ erg/cc at room temperature.

39. The recording medium as defined in claim 38, wherein the medium is constructed and arranged as a magnetooptic recording medium.

40. The method as defined in claim 12, wherein the substrate is maintained in step a) at a temperature of 200°–300° C.

41. The recording medium as defined in any one of claims 8–11 wherein the medium is constructed and arranged as a magnetooptic recording medium.

42. The method as defined in claim 12, wherein z is at least 40 atomic percent.

43. The method as defined in claim 12, wherein the thin film is formed to a thickness of about 0.3 to about 3 μm.

44. The recording medium as defined in claim 19, wherein R is 35–45 atomic percent.

45. The recording medium as defined in claim 19, wherein the perpendicular magnetic anisotropy constant Ku is at least $3.0 \times 10^6$ erg/cc at room temperature.

46. The recording medium as defined in claim 20, wherein the thin film is not thicker than about 3 μm.

47. The recording medium as defined in claim 21, wherein R is Nd.

48. The recording medium as defined in claim 25, wherein Co amounts to about 12–about 27 atomic percent of the sum of Fe and Co to be counted as the balance.

49. The recording medium as defined in claim 32, wherein Fe or the sum of Fe and Co is at least 60 atomic percent.

50. The recording medium as defined in claim 30, wherein the perpendicular magnetic anisotropy constant is at least $3.0 \times 10^6$ erg/cc at room temperature.

51. The recording medium as defined in claim 32, wherein the thin film is not thicker than about 3 μm.

52. The recording medium as defined in claim 30, wherein R is Nd, Pr or a mixture thereof.

53. The recording medium as defined in claim 13, wherein said oxide coating layer is SiO.

54. The recording medium as defined in claim 17, wherein Nd is present at least 25 atomic percent.

55. The recording medium as defined in claim 46, wherein the thin film is at least about 0.7 μm thick.

56. The recording medium as defined in claim 51, wherein the thin film is at least about 0.7 μm thick.

57. The recording medium as defined in claim 52, wherein R is Nd.

58. The recording medium as defined in claim 1, or 33 wherein R is a mixture of Nd and Dy.

59. The recording medium as defined in claim 1, or 33 wherein R is a mixture of Nd and Ce.

60. The recording medium as defined in claim 10, wherein R is Nd, and M is V.

61. The recording medium as defined in claim 52, wherein R is Pr.

62. The recording medium as defined in claim 52, wherein R is a mixture of Nd and Pr.

* * * * *